(12) United States Patent
Kim et al.

(10) Patent No.: US 12,332,702 B2
(45) Date of Patent: Jun. 17, 2025

(54) ELECTRONIC DEVICE COMPRISING HINGE MODULE

(71) Applicant: SAMSUNG ELECTRONICS CO., LTD., Suwon-si (KR)

(72) Inventors: Jungjin Kim, Suwon-si (KR); Hyungsoo Kim, Suwon-si (KR); Chungkeun Yoo, Suwon-si (KR); Iksu Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/231,550

(22) Filed: Aug. 8, 2023

(65) Prior Publication Data

US 2023/0384838 A1    Nov. 30, 2023

Related U.S. Application Data

(63) Continuation of application No. PCT/KR2021/019519, filed on Dec. 21, 2021.

(30) Foreign Application Priority Data

Feb. 8, 2021    (KR) .................. 10-2021-0017529

(51) Int. Cl.
*G06F 3/16*  (2006.01)
*G06F 1/16*  (2006.01)
(Continued)

(52) U.S. Cl.
CPC .......... *G06F 1/1681* (2013.01); *G06F 1/1616* (2013.01); *G06F 1/1652* (2013.01); *G06F 3/0412* (2013.01); *H04M 1/0268* (2013.01)

(58) Field of Classification Search
CPC .... G06F 1/1681; G06F 1/1616; G06F 1/1652; G06F 3/0412; H04M 1/0268; H04M 1/022; H04M 1/0216; H05K 5/0226
See application file for complete search history.

(56) References Cited

U.S. PATENT DOCUMENTS 10,054,990 B1 *  8/2018  Harmon ................ G06F 1/1652
10,154,124 B2 * 12/2018  Mok .................... G06F 1/1679
(Continued)

FOREIGN PATENT DOCUMENTS

JP    2010107044 A    5/2010
KR    19980022504 A   7/1998
(Continued)

OTHER PUBLICATIONS

International Search Report mailed Mar. 31, 2022 for PCT/KR2021/019519.

(Continued)

*Primary Examiner* — Ibrahim A Khan
(74) *Attorney, Agent, or Firm* — CANTOR COLBURN LLP

(57) ABSTRACT

An electronic device includes: first and second housings configured to move relative to each other; a display disposed in the first and second housings; and a hinge module rotatably connecting the first and second housings, where the hinge module includes: first and second rotary members connected to the first and second housings; a rotary bracket in which the first and second rotary members are disposed; a first arm member connected to the first rotary member and including a first cam structure; a second arm member connected to the second rotary member and including a second cam structure; and a third cam structure facing the first and second cam structures, where the first and second cam structures include: an outer cam structure having a first cam profile; and an inner cam structure surrounded by the outer cam structure and having a second cam profile different from the first cam profile.

20 Claims, 16 Drawing Sheets

(51) Int. Cl.
*G06F 3/041* (2006.01)
*H04M 1/02* (2006.01)

(56) References Cited

U.S. PATENT DOCUMENTS

| | | | | |
|---|---|---|---|---|
| 10,423,019 B1* | 9/2019 | Song | ............... | G06F 1/1652 |
| 10,459,493 B2* | 10/2019 | Lee | ............... | E05D 11/105 |
| 10,480,225 B1* | 11/2019 | Hsu | ............... | G06F 1/1616 |
| 10,677,387 B2* | 6/2020 | Han | ............... | F16M 13/005 |
| 10,761,574 B1* | 9/2020 | Hsu | ............... | G06F 1/1616 |
| 10,775,852 B2* | 9/2020 | Kim | ............... | H04M 1/022 |
| 11,023,009 B2* | 6/2021 | Kim | ............... | G06F 1/1681 |
| 2005/0155182 A1* | 7/2005 | Han | ............... | H04M 1/022 |
| | | | | 16/336 |
| 2005/0192066 A1* | 9/2005 | Park | ............... | H04M 1/0247 |
| | | | | 455/575.1 |
| 2005/0202687 A1* | 9/2005 | Park | ............... | H04M 1/0227 |
| | | | | 439/13 |
| 2005/0236869 A1* | 10/2005 | Ka | ............... | G06F 1/1679 |
| | | | | 296/192 |
| 2009/0064462 A1* | 3/2009 | Yin | ............... | G06F 1/1616 |
| | | | | 16/330 |
| 2009/0282650 A1* | 11/2009 | Jin | ............... | H04M 1/0212 |
| | | | | 16/367 |
| 2010/0107366 A1* | 5/2010 | Duan | ............... | H04M 1/0216 |
| | | | | 16/297 |
| 2011/0165921 A1 | 7/2011 | Jung et al. | | |
| 2012/0034955 A1* | 2/2012 | Ahn | ............... | H04M 1/0212 |
| | | | | 455/566 |
| 2012/0099249 A1 | 4/2012 | Duan et al. | | |
| 2012/0149438 A1* | 6/2012 | Kwon | ............... | H04M 1/022 |
| | | | | 16/248 |
| 2012/0165082 A1* | 6/2012 | Kim | ............... | H04M 1/0216 |
| | | | | 455/575.3 |
| 2012/0264489 A1* | 10/2012 | Choi | ............... | H04M 1/0247 |
| | | | | 455/566 |
| 2013/0322004 A1* | 12/2013 | Park | ............... | F16C 11/10 |
| | | | | 16/354 |
| 2016/0048036 A1* | 2/2016 | Cazalet | ............... | G02B 27/0176 |
| | | | | 16/228 |
| 2017/0115701 A1* | 4/2017 | Bae | ............... | G06F 1/16 |
| 2017/0131741 A1* | 5/2017 | In-Sung | ............... | G06F 1/1681 |
| 2018/0059740 A1* | 3/2018 | Kato | ............... | E05D 3/06 |
| 2020/0348732 A1* | 11/2020 | Kang | ............... | G06F 1/1652 |
| 2020/0352044 A1* | 11/2020 | Hsu | ............... | H05K 5/0247 |
| 2021/0181808 A1* | 6/2021 | Liao | ............... | G06F 1/1652 |
| 2022/0086264 A1* | 3/2022 | Lim | ............... | H04M 1/0216 |
| 2022/0155828 A1* | 5/2022 | Hsiang | ............... | G06F 1/1681 |
| 2022/0303371 A1 | 9/2022 | Liao et al. | | |

FOREIGN PATENT DOCUMENTS

| | | |
|---|---|---|
| KR | 20040020545 A | 3/2004 |
| KR | 20040033239 A | 4/2004 |
| KR | 20060088361 A | 8/2006 |
| KR | 100796945 B1 | 1/2008 |
| KR | 100909713 B1 | 7/2009 |
| KR | 100925248 B1 | 11/2009 |
| KR | 20110080492 A | 7/2011 |
| KR | 101574534 81 | 12/2015 |
| KR | 101612962 B1 | 4/2016 |
| KR | 20200117773 A | 10/2020 |
| KR | 20200126524 A | 11/2020 |
| KR | 102186343 B1 | 12/2020 |
| KR | 20220106219 A | 7/2022 |
| WO | 2010093139 A2 | 8/2010 |

OTHER PUBLICATIONS

The European Search Report for EP Application No. 21924995.0 mailed on Jul. 4, 2024.
Korean Office Action for KR Application No. 10-2021-0017529 mailed on Jan. 18, 2025.

* cited by examiner

ELECTRONIC DEVICE COMPRISING HINGE MODULE

CROSS-REFERENCE TO RELATED APPLICATION(S)

This application is a continuation application, claiming priority under § 365(c), of an International application No. PCT/KR2021/019519, filed on Dec. 21, 2021, which is based on and claims the benefit of a Korean patent application number 10-2021-0017529, filed on Feb. 8, 2021, in the Korean Intellectual Property Office, the disclosure of which is incorporated by reference herein in its entirety.

BACKGROUND

1. Field

Various embodiments of the disclosure relate to an electronic device including a hinge module.

2. Description of the Related Art

Owing to the development of information and communication technology and semiconductor technology, various functions are integrated in a single portable electronic device. For example, an electronic device may implement not only a communication function but also an entertainment function such as games, a multimedia function such as music/video playback, a communication and security function such as mobile banking, schedule management, and an electronic wallet function. Such electronic devices are miniaturized so that users may conveniently carry them.

As mobile communication services are extended to the multimedia service area, it is desired to increase the size of a display in an electronic device so that a user may sufficiently use multimedia services as well as voice calls or short messages. However, the size of the display of the electronic device and miniaturization of the electronic device are in a trade-off relationship.

SUMMARY

An electronic device (e.g., a portable terminal) includes a display having a flat surface or flat and curved surfaces. Due to a fixed display structure, there may be limitations in implementing a larger screen than the size of the electronic device including the display.

In implementing a foldable electronic device, it may be difficult to secure mechanical stability, while enabling relative movement (e.g., rotation) between structures of the electronic device. For example, it may be difficult to secure a stable operation mechanism in the foldable electronic device, while securing the portability of the electronic device through miniaturization.

According to various embodiments of the disclosure, an electronic device for stably maintaining a housing in a folded or unfolded state may be provided.

However, the problems to be solved by the disclosure are not limited to the above-described problem, and may be extended in various manners without departing from the scope and spirit of the disclosure.

According to various embodiments of the disclosure, an electronic device includes a first housing, a second housing configured to move relative to the first housing, a display disposed in the first housing and the second housing, and a hinge module connecting the first housing and the second housing to be rotatable from a folded state to an unfolded state. In such embodiments, the hinge module includes a first rotation member connected to the first housing, a second rotation member connected to the second housing, a rotation bracket in which the first rotation member and the second rotation member are disposed, a first arm member connected to the first rotation member and including a first cam structure, a second arm member connected to the second rotation member and including a second cam structure, and a third cam structure facing the first cam structure and the second cam structure. In such embodiments, the first cam structure and the second cam structure include an outer cam structure having a first cam profile and an inner cam structure surrounded by the outer cam structure and having a second cam profile different from the first cam profile.

According to various embodiments of the disclosure, a hinge module includes a first rotation member, a second rotation member, a rotation bracket in which the first rotation member and the second rotation member are disposed, a first arm member connected to the first rotation member and including a first cam structure, a second arm member connected to the second rotation member and including a second cam structure, and a third cam structure facing the first cam structure and the second cam structure. The first cam structure and the second cam structure include an inner cam structure having a first cam profile and an outer cam structure surrounding the inner cam structure and having a second cam profile different from the first cam profile.

According to various embodiments of the disclosure, an electronic device includes a first housing, a second housing, and a hinge module connecting the first housing and the second housing. In such embodiments, the hinge module includes a first rotation member connected to the first housing, a second rotation member connected to the second housing, a first arm member connected to the first rotation member and including a first inner cam structure having a second cam profile, and a first outer cam structure surrounding the first inner cam structure and having a first cam profile different from the second cam profile, a second arm member connected to the second rotation member and including a second inner cam structure having the second cam profile, and a second outer cam structure surrounding the second inner cam structure and forming the first cam profile different from the second cam profile, and a third cam structure facing the first cam structure and the second cam structure. In such embodiments, the first outer cam structure and the second outer cam structure include an outer mountain portion having an outer cam line inclined with respect to a first imaginary line perpendicular to an interlocking axis, and the first inner cam structure and the second inner cam structure include an inner mountain portion having an inner cam line inclined with respect to the first imaginary line.

An electronic device according to various embodiments of the disclosure may be stably maintained in an unfolded state at a specified angle or a user-desired angle by use of an inner cam structure and an outer cam structure which have different cam profiles, respectively.

An electronic device according to various embodiments of the disclosure may reduce a force to open the electronic device and thus increase user convenience by use of a cam structure rotating in a direction to open the electronic device at a specified angle.

DETAILED DESCRIPTION

Figure 1:
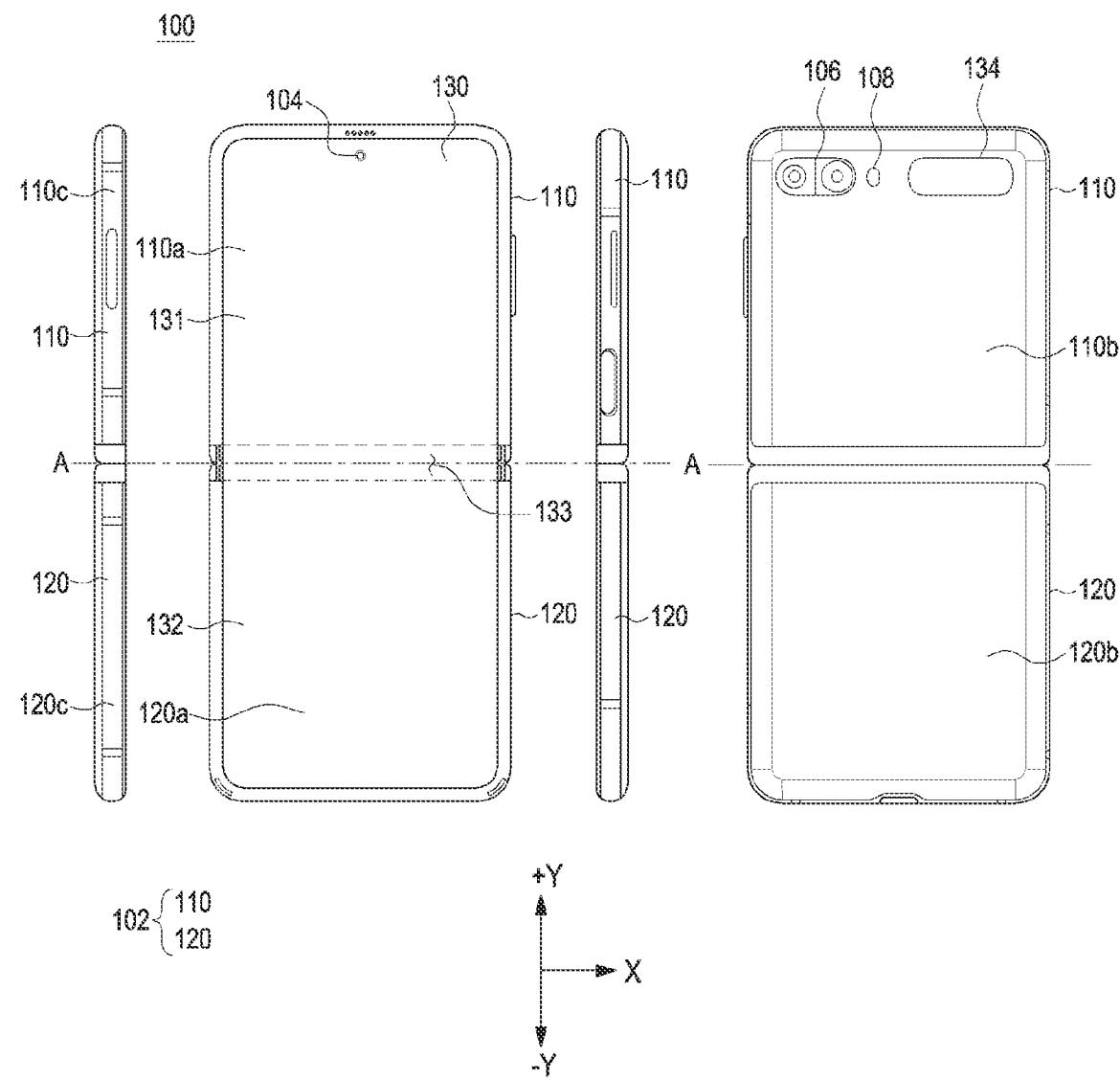
FIG. 1 is a diagram illustrating an electronic device in an unfolded state according to various embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be understood that when an element is referred to as being "on" another element, it can be directly on the other element or intervening elements may be present therebetween. In contrast, when an element is referred to as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
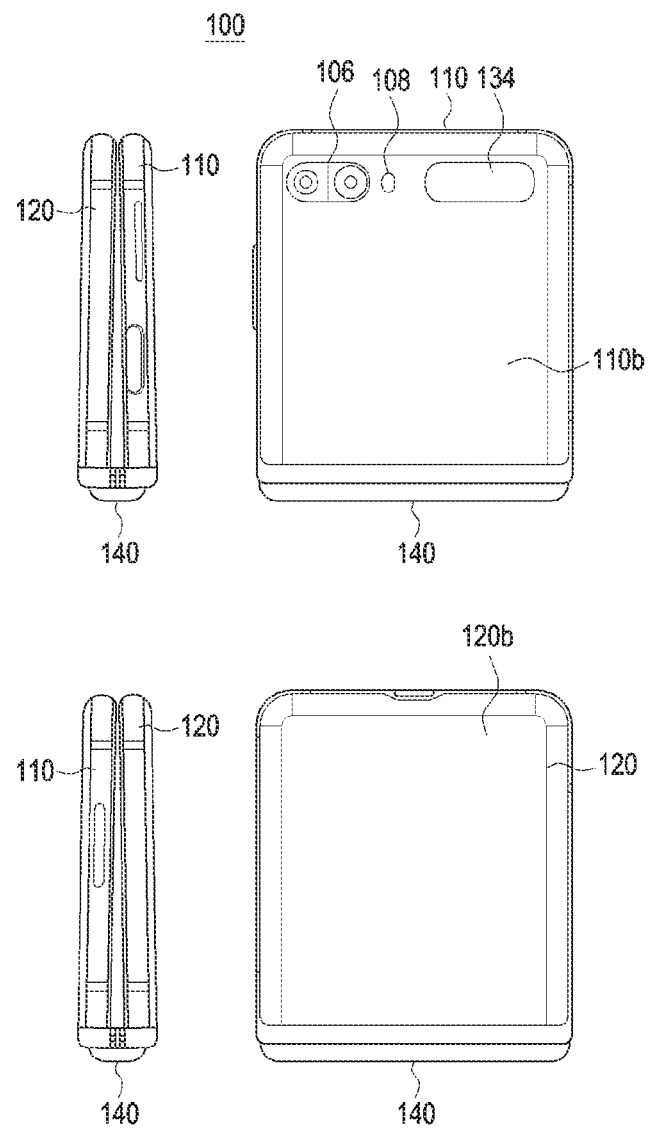
FIG. 2 is a diagram illustrating an electronic device in a folded state according to various embodiments of the disclosure.

FIG. 1 is a diagram illustrating an electronic device in an unfolded state according to an embodiment of the disclosure. FIG. 2 is a diagram illustrating an electronic device in a folded state according to an embodiment of the disclosure.

Referring to FIGS. 1 and 2, an embodiment of an electronic device 100 may include a foldable housing 102 (hereinafter, referred to as a housing 102) to accommodate components (e.g., a hinge module 180 of FIG. 3) of the electronic device 100 therein, and a flexible or foldable display 130 (hereinafter, referred to as a display 130) disposed in a space formed by (or defined in) the housing 102.

According to various embodiments, the housing 102 may include a first housing 110 and a second housing 120.

According to various embodiments, the first housing 110 and/or the second housing 120 may form at least part of the exterior of the electronic device 100. According to an embodiment, a surface on which the display 130 is visually exposed is defined as a front surface (e.g., a first front surface 110a and a second front surface 120a) of the electronic device 100 and/or the housing 102. A surface opposite to the front surface is defined as a rear surface (e.g., a first rear surface 110b and a second rear surface 120b) of the electronic device 100. A surface surrounding at least a part of a space between the front and rear surfaces is defined as a side surface (e.g., a first side surface 110c and a second side surface 120c) of the electronic device 100.

Figure 3:
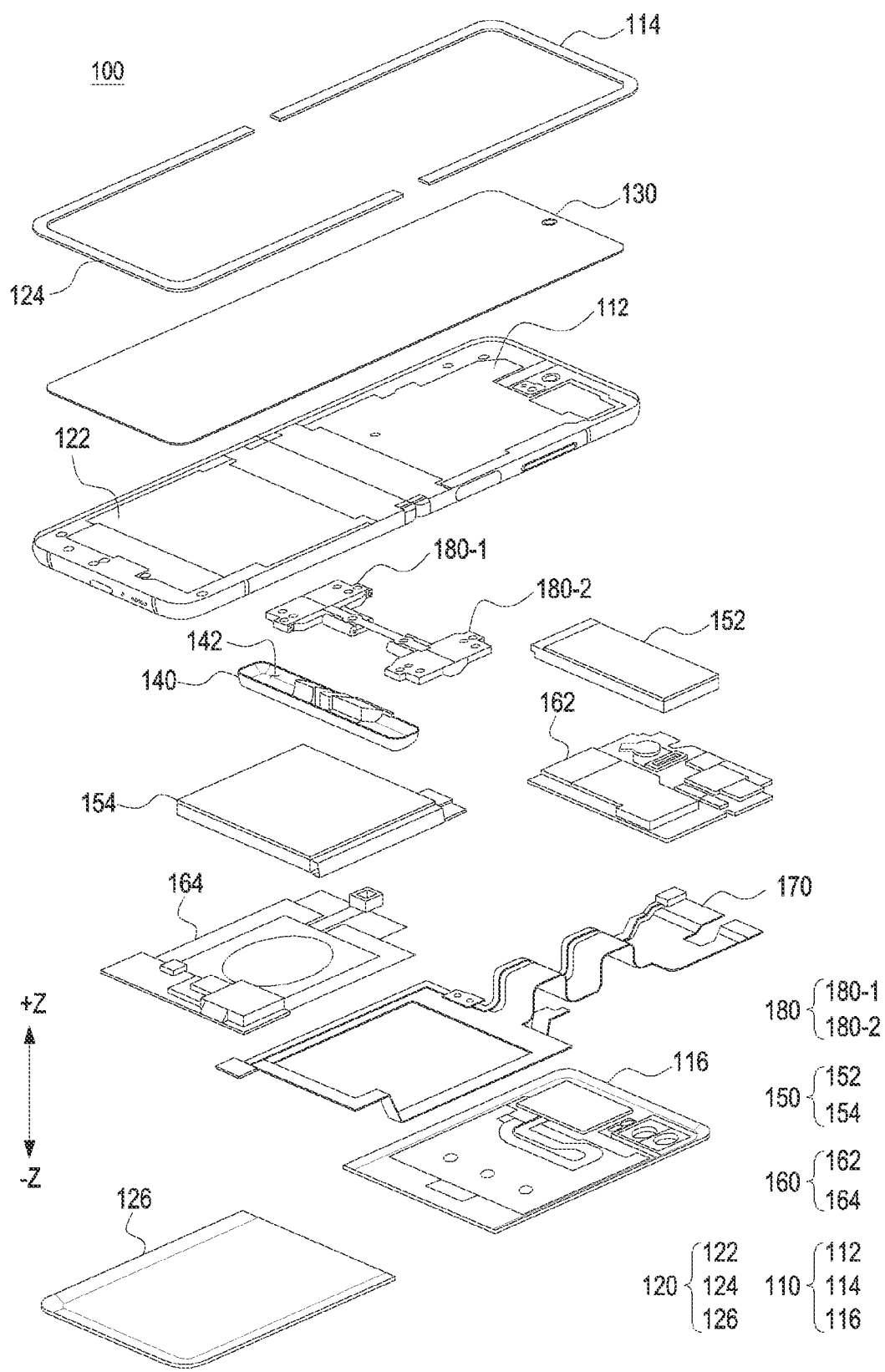
FIG. 3 is an exploded perspective view illustrating an electronic device according to various embodiments of the disclosure.

According to various embodiments, the first housing 110 may be connected to be rotatable with respect to the second housing 120 by using the hinge module (e.g., the hinge module 180 of FIG. 3). For example, each of the first housing 110 and the second housing 120 may be connected to each other to be rotatable with respect to the hinge module 180. The electronic device 100 may be changed to the folded state (e.g., FIG. 2) or the unfolded state (e.g., FIG. 1). In the electronic device 100, the first front surface 110a may face the second front surface 120a in the folded state, and the first front surface 110a and the second front surface 120a may face in a same direction as each other in the unfolded state. For example, the first front surface 110a and the second front surface 120a may be located substantially on a same plane in the unfolded state. According to an embodiment, the second housing 120 may provide relative movement with respect to the first housing 110.

According to various embodiments, the first housing 110 and the second housing 120 may be disposed on opposing sides of a folding axis A and symmetrical in shape with respect to the folding axis A as a whole. An angle between the first housing 110 and the second housing 120 may be changed depending on whether the electronic device 100 is in the unfolded state, the folded state, or an intermediate state between the unfolded state and the folded state, as described later. According to an embodiment, the folding axis A may be an imaginary axis located between a first rotation axis (e.g., a first rotation axis Ax1 of FIG. 4) and a second rotation axis (e.g., a second rotation axis Ax2 of FIG. 4).

According to an embodiment, as shown in FIG. 2, the electronic device 100 may include a hinge housing 140. The hinge housing 140 may be disposed between the first housing 110 and the second housing 120. According to an embodiment, the hinge housing 140 may be covered by parts of the first housing 110 and the second housing 120 or exposed to the outside of the electronic device 100 according to the state of the electronic device 100. According to an embodiment, the hinge housing 140 may protect the hinge module (e.g., the hinge module 180 of FIG. 3) from impacts from the outside of the electronic device 100. According to an embodiment, the hinge housing 140 may be interpreted as a hinge cover that protects the hinge module 180.

According to an embodiment, as illustrated in FIG. 1, when the electronic device 100 is in the unfolded state, the hinge housing 140 may be covered by the first housing 110 and the second housing 120 without being exposed. In an embodiment, for example, as illustrated in FIG. 2, when the electronic device 100 is in the folded state (e.g., a fully folded state), the hinge housing 140 may be exposed to the outside from between the first housing 110 and the second housing 120. In an embodiment, for example, in the intermediate state where the first housing 110 and the second housing 120 are folded with a certain angle, the hinge housing 140 may be partially exposed to the outside from between the first housing 110 and the second housing 120. In this state, however, an exposed area may be smaller than in the fully folded state. In an embodiment, the hinge housing 140 may include a curved surface.

According to various embodiments, the display 130 may refer to a display having at least a partial area deformable into a flat or curved shape. For example, the display 130 may be formed to be changed in response to relative movement of the second housing 120 with respect to the first housing 110. According to an embodiment, the display 130 may include a folding area 133, a first display area 131 disposed on one side (e.g., above (the +Y direction)) of the folding area 133, and a second display area 132 disposed on the other side (e.g., below (the −Y direction)) of the folding area 133. According to an embodiment, the folding area 133 may be located above the hinge module (e.g., the hinge module 180 of FIG. 3). According to an embodiment, the first display area 131 may be disposed on the first housing 110, and the second display area 132 may be disposed on the second housing 120. According to an embodiment, the display 130 may be disposed or accommodated in the first housing 110 and the second housing 120.

However, the area division of the display 130 illustrated in FIG. 1 is exemplary, and the display 130 may be divided into a plurality of areas (e.g., four or more areas or two areas) according to a structure or function. In addition, while the display 130 is divided into areas by the folding area 133 extending in parallel to an X axis or the folding axis A in the embodiment illustrated in FIG. 1, the display 130 may be divided into areas by another folding area (e.g., a folding area parallel to a Y axis) or another folding axis (e.g., a folding axis parallel to the Y axis) in another embodiment. According to an embodiment, the display 130 may be coupled with or disposed adjacent to a touch sensing circuit, a pressure sensor capable of measuring the intensity (pressure) of a touch, and/or a digitizer configured to detect a magnetic field type stylus pen.

According to various embodiments, the electronic device 100 may include a rear display 134. The rear display 134 may face in a direction different from (or opposite to) that of the display 130. For example, the display 130 may be visually exposed through the front surface (e.g., the first front surface 110a and/or the second front surface 120a) of the electronic device 100, and the rear display 134 may be visually exposed through the rear surface (e.g., the first rear surface 110b) of the electronic device 100.

According to various embodiments, the electronic device 100 may include at least one camera module 104 and 106 and a flash 108. According to an embodiment, the electronic device 100 may include a front camera module 104 exposed through the front surface (e.g., the first front surface 110a) and/or a rear camera module 106 exposed through the rear surface (e.g., the first rear surface 120b). The camera modules 104 and 106 may include one or more lenses, an image sensor, a flash, and/or an image signal processor. The flash 108 may include a light emitting diode or a xenon lamp. In an embodiment, for example, two or more lenses (an infrared camera, a wide-angle lens, and a telephoto lens) and image sensors may be disposed on one surface of the electronic device 100.

Figure 4:
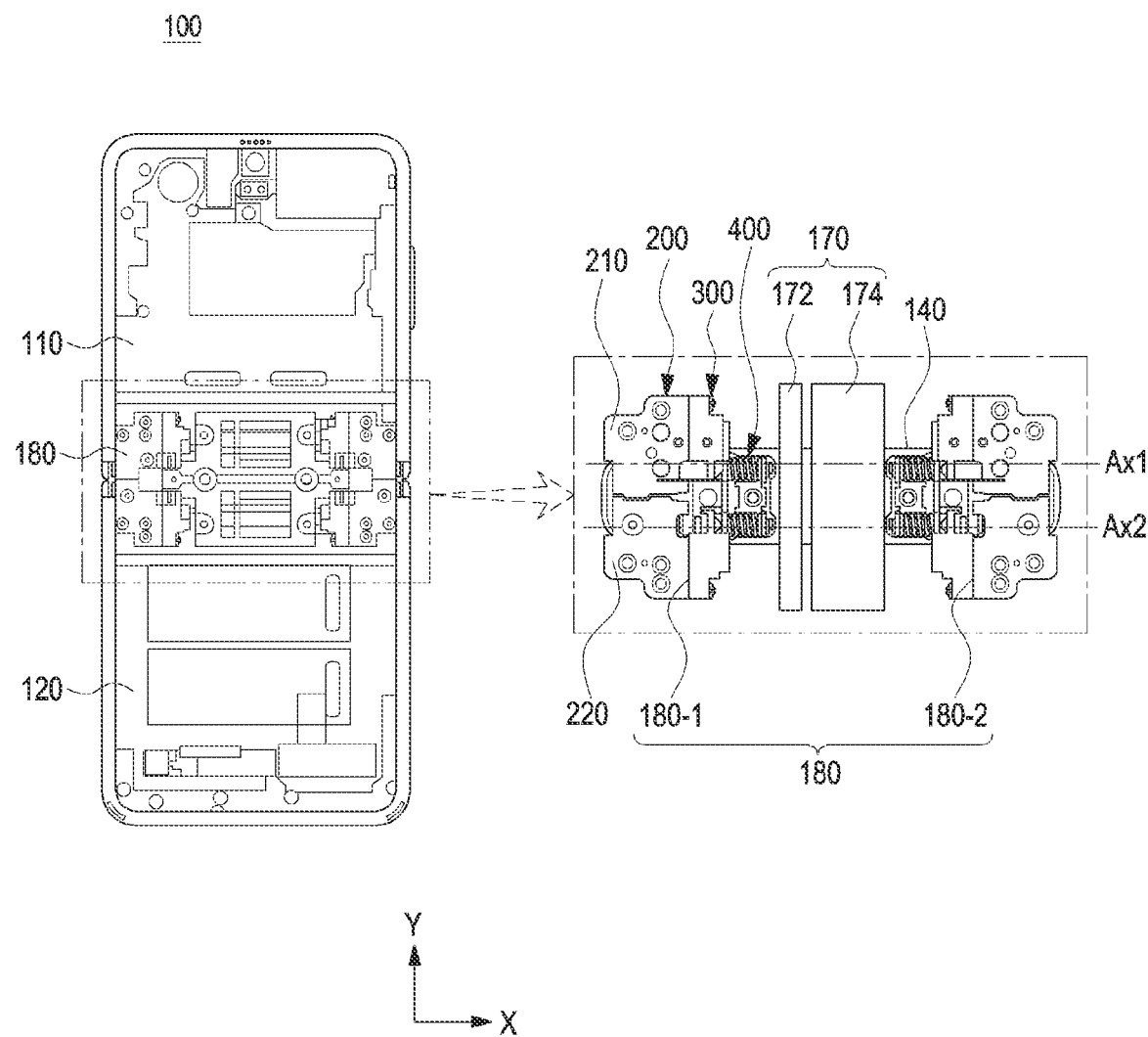
FIG. 4 is a front view illustrating an electronic device with a display excluded therefrom according to various embodiments of the disclosure.

FIG. 3 is an exploded perspective view illustrating an electronic device according to various embodiments of the disclosure. FIG. 4 is a front view illustrating an electronic device with a display excluded therefrom according to various embodiments of the disclosure.

Referring to FIGS. 3 and 4, an embodiment of the electronic device 100 may include the first housing 110, the second housing 120, the display 130, the hinge housing 140, a battery 150, a printed circuit board 160, a flexible printed circuit board 170, and the hinge module 180. The configurations of the first housing 110, the second housing 120, the display 130, and the hinge housing 140 of FIGS. 3 and 4 may be wholly or partially identical to those of the first housing 110, the second housing 120, the display 130, and the hinge housing 140 of FIGS. 1 and 2.

According to an embodiment, the housings 110 and 120 may include a first support member 112 and a second support member 122. For example, the first housing 110 may include the first support member 112, and the second housing 120 may include the second support member 122. According to an embodiment, the first support member 112 and/or the second support member 122 may support components (e.g., the display 130, the battery 150, and the printed circuit board 160) of the electronic device 100.

According to an embodiment, the first support member 112 and/or the second support member 122 may include or be formed of a metal material and/or a non-metal (e.g., polymer) material. According to an embodiment, the first support member 112 may be disposed between the display 130 and the battery 150. For example, the display 130 may be coupled with one surface of the first support member 112, and the battery 150 and the printed circuit board 160 may be disposed on the other surface of the first support member 112.

According to an embodiment, the electronic device 100 may include a first decorative member 114 and a second decorative member 124. For example, the first housing 110 may include the first decorative member 114, and the second housing 120 may include the second decorative member 124. According to an embodiment, the decorative members 114 and 124 may protect the display 130 from external impact. For example, the first decorative member 114 may at least partially surround a part (e.g., the first display area 131 of FIG. 1) of the display 130, and the second decorative member 124 may at least partially surround another part (e.g., the second display area 132 of FIG. 1) of the display 130.

According to an embodiment, the housings 110 and 120 may include a first rear plate 116 and a second rear plate 126. For example, the first housing 110 may include the first rear plate 116 connected to the first support member 112, and the second housing 120 may include the second rear plate 126 connected to the second support member 122. According to an embodiment, the rear plates 116 and 126 may form a part of the exterior of the electronic device 100. For example, the first rear plate 116 may form the first rear surface (e.g., the first rear surface 110b of FIG. 1), and the second rear plate 126 may form the second rear surface (e.g., the second rear surface 120b of FIG. 1). According to an embodiment, a first battery 152 and a first printed circuit board 162 may be disposed between the first support member 112 and the first rear plate 116, and a second battery 154 and a second printed circuit board 164 may be disposed between the second support member 122 and the second rear plate 126.

According to an embodiment, the hinge housing 140 may accommodate at least a part of the hinge module 180. For example, the hinge housing 140 may include or define an accommodation groove 142 to accommodate the hinge module 180 therein. According to an embodiment, the hinge housing 140 may be coupled with the hinge module 180. According to an embodiment, at least a part of the hinge housing 140 may be located between the hinge module 180 and the housings 110 and 120 in the unfolded state of the electronic device 100.

According to an embodiment, the battery 150, which is a device to supply power to at least one component of the electronic device 100, may include a non-rechargeable primary battery, a rechargeable secondary battery, or a fuel cell. The battery 150 may be integrally disposed inside the electronic device 100 or detachably from the electronic device 100. According to an embodiment, the battery 150 may include the first battery 152 disposed within the first housing 110 and the second battery 154 disposed within the second housing 120. For example, the first battery 152 may be disposed on the first support member 112, and the second battery 154 may be disposed on the second support member 122.

According to an embodiment, a processor, memory, and/or an interface may be mounted on the printed circuit board 160. The processor may include at least one of, for example, a central processing unit (CPU), an application processor, a graphical processing unit, an image signal processor, a sensor hub processor, or a communication processor. The memory may include volatile memory or non-volatile memory. The interface may include, for example, a high definition multimedia interface (HDMI), a universal serial bus (USB) interface, an SD card interface, and/or an audio interface. The interface may electrically or physically connect the electronic device 100 to an external electronic device and include a USB connector, an SD card/MMC connector, or an audio connector. According to an embodiment, the printed circuit board 160 may include the first printed circuit board 162 disposed within the first housing 110 and the second printed circuit board 164 disposed within the second housing 120.

According to various embodiments, the flexible printed circuit board 170 may electrically connect a component (e.g., the first printed circuit board 162) located in the first housing 110 to a component (e.g., the second printed circuit board 164) located in the second housing 120. According to an embodiment, the flexible printed circuit board 170 may cross (or extend across) the hinge housing 140. For example, a part of the flexible printed circuit board 170 may be disposed within the first housing 110, and another part thereof may be disposed within the second housing 120. According to an embodiment, the flexible printed circuit board 170 may include a first flexible printed circuit board 172 connected to an antenna and a second flexible printed circuit board 174 connected to the display 130.

According to various embodiments, the hinge module 180 may be connected to the first housing 110 and the second housing 120. In an embodiment, for example, as shown in FIG. 4, the hinge module 180 may include a first rotation member 210 connected to or coupled with the first support member 112 of the first housing 110 and a second rotation member 220 connected to or coupled with the second support member 122 of the second housing 120. According to an embodiment, the first housing 110 may rotate with respect to the second housing 120 by using the hinge module 180. For example, the first housing 110 and/or the first rotation member 210 may rotate around the first rotation axis Ax1, and the second housing 120 and/or the second rotation member 220 may rotate around the second rotation axis Ax2. According to an embodiment, the hinge module 180 may connect the first housing 110 and the second housing 120 to each other such that the first housing 110 and the second housing 120 are rotatable from the folded state (e.g., FIG. 2) to the unfolded state (e.g., FIG. 1). According to an embodiment, the hinge module 180 may be disposed between the housing 102 and the display 130. According to an embodiment, the second rotation axis Ax2 may be disposed substantially parallel to the first rotation axis Ax1.

According to various embodiments, the hinge module 180 may include a rotation structure 200, an interlocking structure 300, and a fixing structure 400.

According to various embodiments, the rotation structure 200 may substantially implement or guide rotation of the first housing 110 and/or the second housing 120. According to an embodiment, the rotation structure 200 may provide the first rotation axis Ax1 and the second rotation axis Ax2. According to an embodiment, the rotation structure 200 may be connected to the first support member 112 of the housing 110 and the second support member 122 of the second housing 120.

According to various embodiments, the interlocking structure 300 may interlock rotation of the first housing 110 with rotation of the second housing 120. According to an embodiment, the interlocking structure 300 may transfer at least a part of a force applied to the first housing 110 to the second housing 120 or transfer at least a part of a force applied to the second housing 120 to the first housing 110. For example, the interlocking structure 300 may rotate the second housing 120 at the substantially same angle as an angle at which the first housing 110 rotates by using a gear member (e.g., a gear member 330 of FIG. 8).

According to various embodiments, the fixing structure 400 may maintain the relative position of the first housing 110 and the second housing 120 at a certain angle. For example, the fixing structure 400 may provide pressure to the interlocking structure 300 to prevent or reduce movement and/or rotation of the first housing 110 and/or the second housing 120 of the electronic device 100. For example, when a user applies external force equal to or greater than a predetermined value, the hinge module 180 may allow rotation of the first housing 110 and/or the second housing 120. When no external force is applied or external force less than the predetermined value is applied, the hinge module 180 may maintain the first housing 110 and/or the second housing 120 in a stationary state by using the fixing structure 400.

According to an embodiment, the hinge module 180 may include a plurality of hinge modules 180-1 and 180-2 arranged in parallel. For example, the hinge module 180 may include a first hinge module 180-1 and a second hinge module 180-2 facing the first hinge module 180-1, which are disposed on the hinge housing 140. According to an embodiment, the first hinge module 180-1 and the second hinge module 180-2 may be symmetrical to each other with respect to a length direction (e.g., Y-axis direction) of the electronic device 100.

Figure 5:
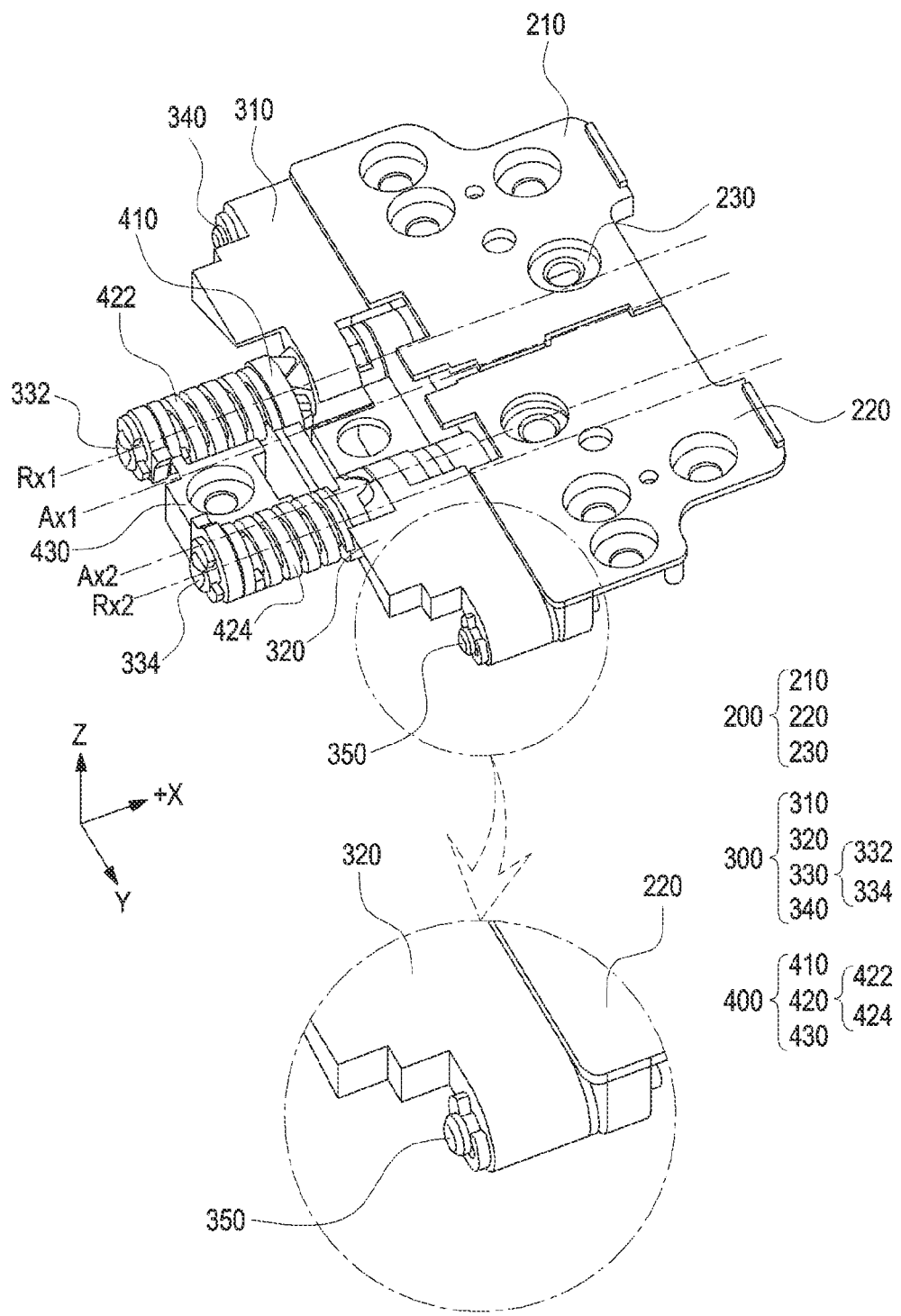
FIG. 5 is a perspective view illustrating a hinge module according to various embodiments of the disclosure.
Figure 6:
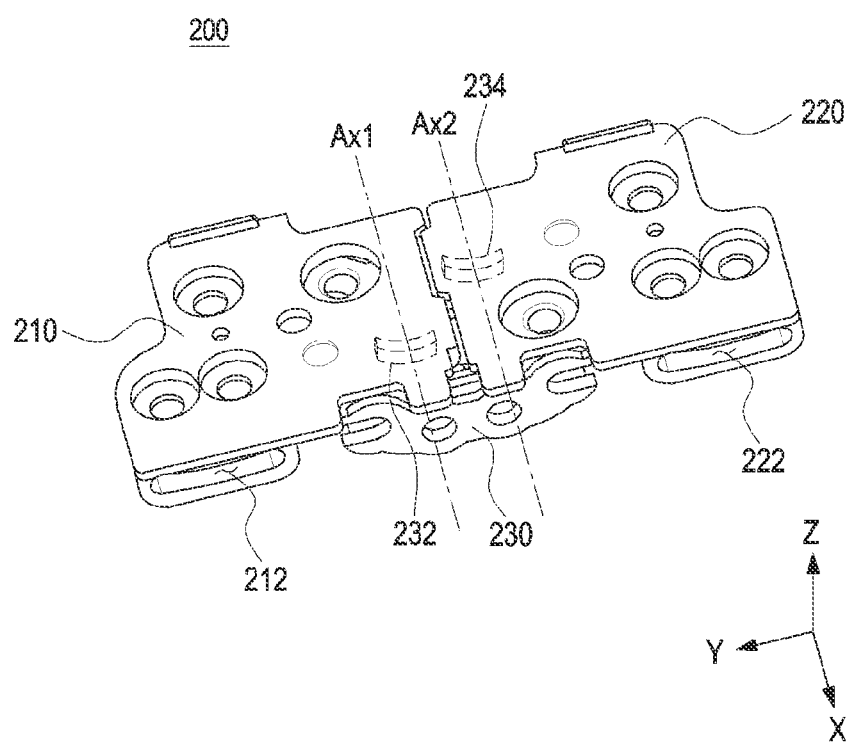
FIG. 6 is a perspective view illustrating a rotation structure according to various embodiments of the disclosure.
Figure 7A:
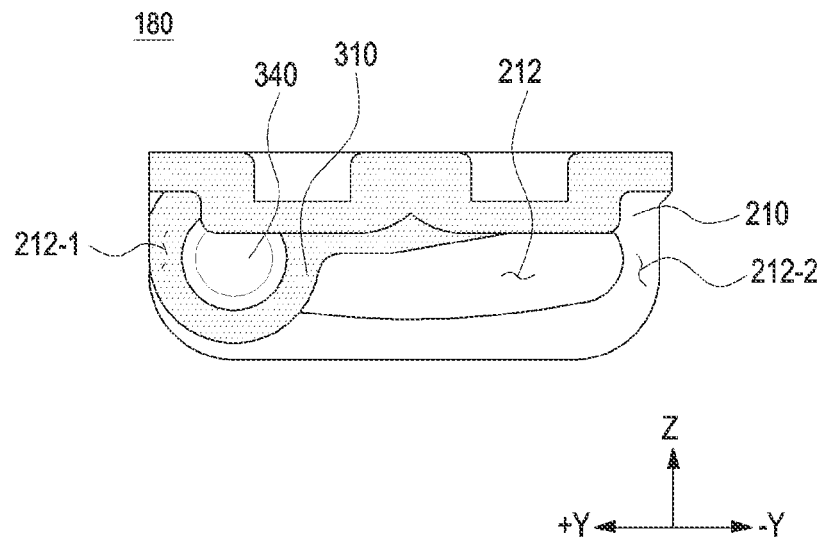
FIGS. 7A and 7B are diagrams illustrating sliding movement of an arm member with respect to a rotation structure according to various embodiments of the disclosure.
Figure 7B:
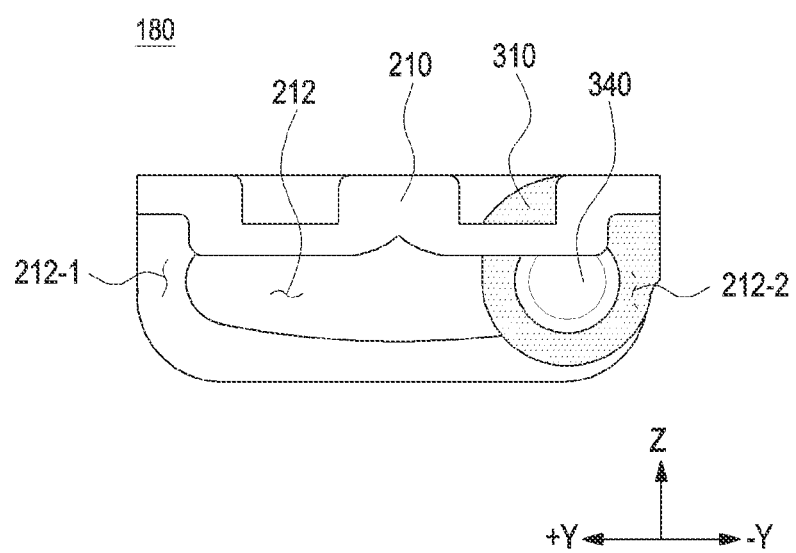

FIG. 5 is a perspective view illustrating a hinge module according to various embodiments of the disclosure. FIG. 6 is a perspective view illustrating a rotation structure according to various embodiments of the disclosure. FIGS. 7A and 7B are diagrams illustrating sliding movement of an arm member with respect to a rotation structure according to various embodiments of the disclosure.

Referring to FIGS. 5, 6, 7A, and 7B, the hinge module 180 may include the rotation structure 200, the interlocking structure 300, and/or the fixing structure 400. The configuration of the hinge module 180 of FIGS. 5, 6, 7A, and 7B may be wholly or partially the same as the configuration of the hinge module 180 of FIG. 4.

According to various embodiments, the rotation structure 200 may include a first rotation member 210, a second rotation member 220, and a rotation bracket 230. According to an embodiment, the first rotation member 210 may be connected to the first housing (e.g., the first housing 110 of FIG. 4), and the second rotation member 220 may be connected to the second housing (e.g., the second housing 120 of FIG. 4).

According to various embodiments, as shown in FIG. 6, the rotation bracket 230 may accommodate the first rotation member 210 and the second rotation member 220. For example, the rotation bracket 230 may include a first rotation groove 232 formed or defined therein around the first rotation axis Ax1 and a second rotation groove 234 formed or defined therein around the second rotation axis Ax2. According to an embodiment, the first rotation member 210 may be disposed or accommodated in the first rotational groove 232 and rotate around the first rotation axis Ax1, and the second rotation member 220 may be disposed or accommodated in the second rotation groove 234 and rotate around the second rotation axis Ax2.

According to various embodiments, the rotation members 210 and 220 may include or be provided with pin holes 212 and 222 to accommodate pin members 340 and 350 therein. For example, the first rotation member 210 may include a first pin hole 212 in which a first pin member 340 is located, and the second rotation member 220 may include a second pin hole 222 in which a second pin member 350 is located. According to an embodiment, the pin holes 212 and 222 may be holes extending in a longitudinal direction (e.g., Y-axis direction) of the electronic device 100.

According to various embodiments, the interlocking structure 300 may include a first arm member 310, a second arm member 320, a gear member 330, the first pin member 340, and the second pin member 350.

According to various embodiments, the gear member 330 may include a first gear shaft 332 rotatable around a first interlocking axis Rx1 and a second gear shaft 334 rotatable around a second interlocking axis Rx2. According to an embodiment, a gear (e.g., a first gear 332a of FIG. 8) of the first gear shaft 332 and a gear (e.g., a second gear 332b of FIG. 8) of the second gear shaft 334 may be meshed with each other to interlock the first housing (e.g., the first housing 110 of FIG. 1) and the second housing (e.g., the second housing 120 of FIG. 1). For example, a force from the first rotation member 210 connected to the first housing 110 may be transmitted to the first gear shaft 332 through the first arm member 310. The first gear shaft 332 may be meshed with the second gear shaft 334, and the second gear shaft 334 may rotate in a direction different from that of the first gear shaft 332. A force applied to the second gear shaft 334 may be transmitted to the second arm member 320 and/or the second housing 120. According to an embodiment, the interlocking structure 300 may include a gear cover (not shown) to protect the first gear shaft 332 and/or the second gear shaft 334 from external impact. The gear cover (not shown) may surround at least a part of the first gear 332a and/or the second gear 332b.

According to various embodiments, the arm members 310 and 320 may be connected to the pin members 340 and 350. According to an embodiment, the first arm member 310 may be coupled with the first pin member 340, and the second arm member 320 may be coupled with the second pin member 350. According to an embodiment, the first arm member 310 may rotate around the first interlocking axis Rx1 together with the first gear shaft 332, and the second arm member 320 may rotate around the second interlocking axis Rx2 together with the second gear shaft 334. According to an embodiment, the arm members 310 and 320 may be connected to the rotation members 210 and 220 by using the pin members 340 and 350. For example, the first pin member 340 connected to the first arm member 310 may be disposed or accommodated in the first pin hole 212 of the first rotation member 210, and the second pin member 350 connected to the second arm member 320 may be disposed or accommodated in the second pin hole 222 of the second rotation member 220. The rotation axes Ax1 and Ax2 may be different from the interlocking axes Rx1 and Rx2 of the gear shafts 332 and 334. For example, the first rotation axis Ax1, the second rotation axis Ax2, the first interlocking axis Rx1, and the second interlocking axis Rx2 may be substantially parallel to each other.

According to various embodiments, the arm members 310 and 320 may slide with respect to the rotation members 210 and 220. According to an embodiment, the first pin member 340 connected to the first arm member 310 may slide within the first pin hole 212 in the longitudinal direction (e.g., Y-axis direction). In an embodiment, for example, when the electronic device (e.g., the electronic device 100 of FIG. 1) is in an open state (e.g., FIG. 7A), the first pin member 340 may contact a first sidewall 212-2 of the first arm member 310 directed toward the top of the electronic device 100 (a first direction) (e.g., the +Y direction). In such an embodiment, for example, when the electronic device 100 is in a closed state (e.g., FIG. 7B), the first pin member 340 may contact a second sidewall 212-2 of the first arm member 310 directed toward the bottom of the electronic device 100 (a second direction) (e.g., the −Y direction). According to an embodiment, as the arm members 310 and 320 slide, breakage of the display (e.g., the display 130 of FIG. 3) may be effectively prevented or substantially reduced, which might otherwise be caused due to the interlocking axes Rx1 and Rx2 different from the rotation axes Ax1 and Ax2. For example, a relative length change may occur in the electronic device 100 based on the length of the electronic device (e.g., the electronic device 100 of FIG. 1) in a thickness direction (e.g., the +Z direction). According to an embodiment, the radius of curvature of the rotation members 210 and 220 rotating around on the rotation axes Ax1 and Ax2 may be different from the radius of curvature of the arm members 310 and 320 rotating around the interlocking axes Rx1 and Rx2. As the arm members 310 and 320 slide with respect to the rotation members 210 and 220 by using the pin members 340 and 350, breakage of the display 130 accommodated in the housing (e.g., the housing 102 of FIG. 1) connected to the rotation members 210 and 220 may be effectively prevented or substantially reduced. In an embodiment of the electronic device 100 in the folded state (e.g., FIG. 2), the display 130 may include a neutral surface having no length change in the folded state. A compressive force may be applied to a top area (e.g., the +Z direction) of the display 130 with respect to the neutral surface, and an extension force or an expansion force may be applied to a bottom area (e.g., the −Z direction) of the display 130. According to an embodiment, the rotation axes Ax1 and Ax2 may substantially form a part of the neutral surface of the display 130, and the interlocking axes Rx1 and Rx2 may be located outside the neutral surface.

According to various embodiments, the fixing structure 400 may include a third cam structure 410, an elastic member 420, and a fixing bracket 430. The fixing structure 400 may provide pressure or elastic force to the first arm member 310 and the second arm member 320. According to an embodiment, the third cam structure 410 may face a first cam structure (e.g., a first cam structure 311 of FIG. 8) of the first arm member 310 and/or a second cam structure (e.g., a second cam structure 321 of FIG. 8) of the second arm member 320. According to an embodiment, the elastic member 420 may provide an elastic force to the third cam structure 410 in a third direction (e.g., +X direction), and the third cam structure 410 may come into contact with the first cam structure 311 and/or the second cam structure 321. According to an embodiment, the fixing bracket 430 may connect the hinge module 180 to the hinge housing (e.g., the hinge housing 140 of FIG. 4). For example, the fixing bracket 430 may be coupled with the hinge housing 140, and the elastic member 420 may be connected to the fixing bracket 430.

Figure 8:
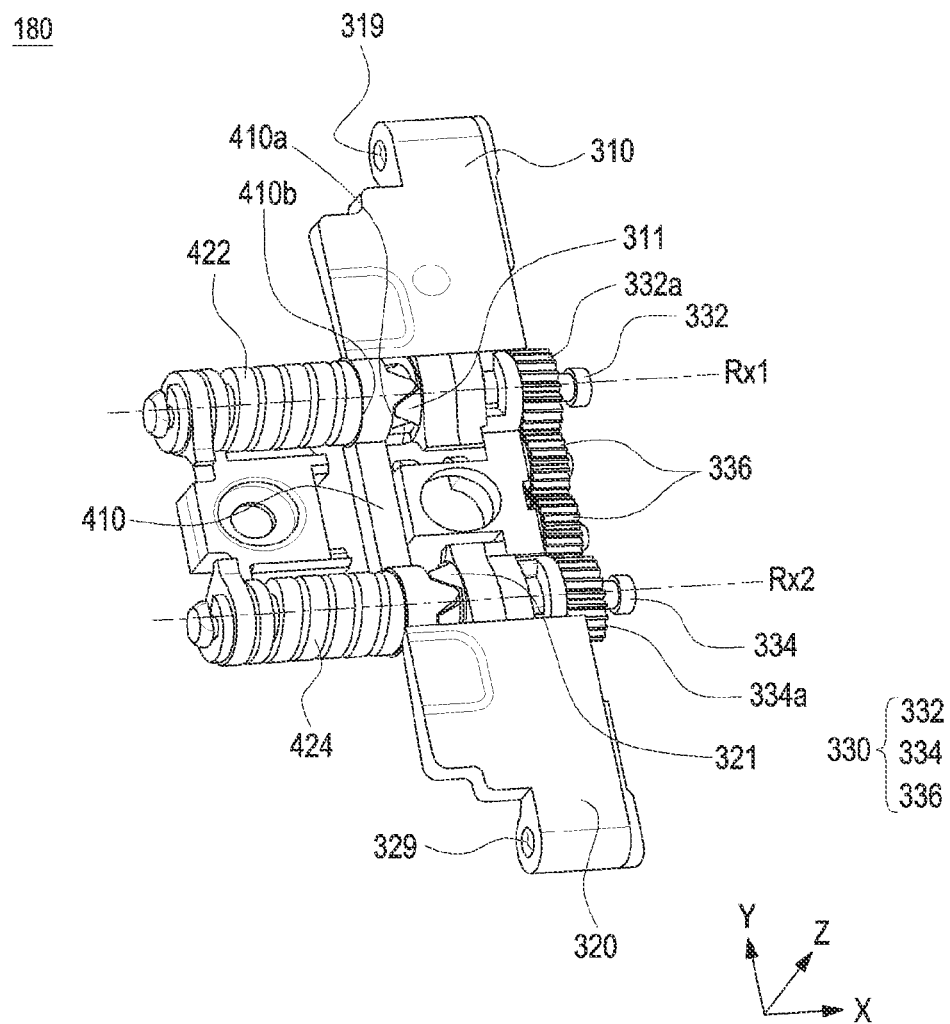
FIG. 8 is a perspective view illustrating an interlocking structure and a detent structure according to various embodiments of the disclosure.

FIG. 8 is a perspective view illustrating a hinge module including an interlocking structure and a fixing structure according to various embodiments of the disclosure.

Referring to FIG. 8, in an embodiment, the hinge module 180 may include the interlocking structure 300 and the fixing structure 400. The configurations of the interlocking structure 300 and the fixing structure 400 of FIG. 8 may be wholly or partially the same as those of the interlocking structure 300 and the fixing structure 400 of FIG. 5.

According to various embodiments, the arm members 310 and 320 may include the cam structures 311 and 321. For example, the first arm member 310 may include the first cam structure 311, and the second arm member 320 may include the second cam structure 321. According to an embodiment, the first cam structure 311 may surround the first gear shaft 332, and the second cam structure 321 may surround the second gear shaft 334. As the first cam structure 11 rotates with the first gear shaft 332, the first arm member 310 may rotate substantially around a rotation axis (e.g., the first interlocking axis Rx1) of the first gear shaft 332. According to an embodiment, the first cam structure 311 may be integrally formed with the first arm member 310 as a single unitary and indivisible part. For example, the second cam structure 321 may be mounted or fixed, while surrounding an outer circumferential surface of the second gear shaft 334. As the second cam structure 321 rotates together with the second gear shaft 334, the second arm member 320 may substantially rotate around a rotation axis (e.g., the second interlocking shaft Rx2) of the second gear shaft 334. According to an embodiment, the second cam structure 321 may be integrally formed with the second arm member 320 as a single unitary and indivisible part.

According to various embodiments, the arm members 310 and 320 may include or define accommodation recesses 319 and 329 to accommodate the pin members (e.g., the pin members 340 and 350 of FIG. 5) therein. For example, the first arm member 310 may include a first accommodation recess 319 in which the first pin member 340 is disposed, and the second arm member 320 may include a second accommodating recess 329 in which the second pin member 350 is disposed. Each of the accommodation recesses 319 and 329 may be in the shape of a groove or a hole.

According to various embodiments, the hinge module 180 may include the gear member 330 including a plurality of idle gears 336 disposed between the first gear shaft 332 and the second gear shaft 334. The plurality of (e.g., two) idle gears 336 may be connected to the first gear 332a of the first gear shaft 332 and the second gear 332b of the second gear shaft 334. According to an embodiment, rotation of the first gear shaft 332 may be transferred to the second gear shaft 334 through the plurality of idle gears 336, and rotation of the second gear shaft 334 may be transferred to the first gear shaft 332 through the plurality of idle gears 336.

According to various embodiments, the third cam structure 410 may provide pressure or a frictional force to the first cam structure 311 and/or the second cam structure 321. For example, the third cam structure 410 may effectively prevent or substantially reduce rotational movement of the first arm member 310 and/or the second arm member 320 or rotational movement of the first arm member 310 and/or the second arm member 320 in a specified direction by contacting the first cam structure 311 of the first arm member 310 and/or the second cam structure 321 of the second arm member 320.

According to various embodiments, the third cam structure 410 may include a first third cam structure (hereinafter, will be referred to as "(3-1)$^{th}$ cam structure") 410-1 facing the first cam structure 311 and a second third cam structure (hereinafter, will be referred to as "(3-2)$^{th}$ cam structure") 410-2 facing the second cam structure 321. The (3-1)$^{th}$ cam structure 410-1 may surround the first gear shaft 332, and the (3-2)$^{th}$ cam structure 410-2 may surround the second gear shaft 334. According to an embodiment, the (3-1)$^{th}$ cam structure 410-1 may be disposed between a first elastic member 422 and the first cam structure 311, and the (3-2)$^{th}$ cam structure 410-2 may be disposed between a second elastic member 424 and the second cam structure 321.

Figure 9:
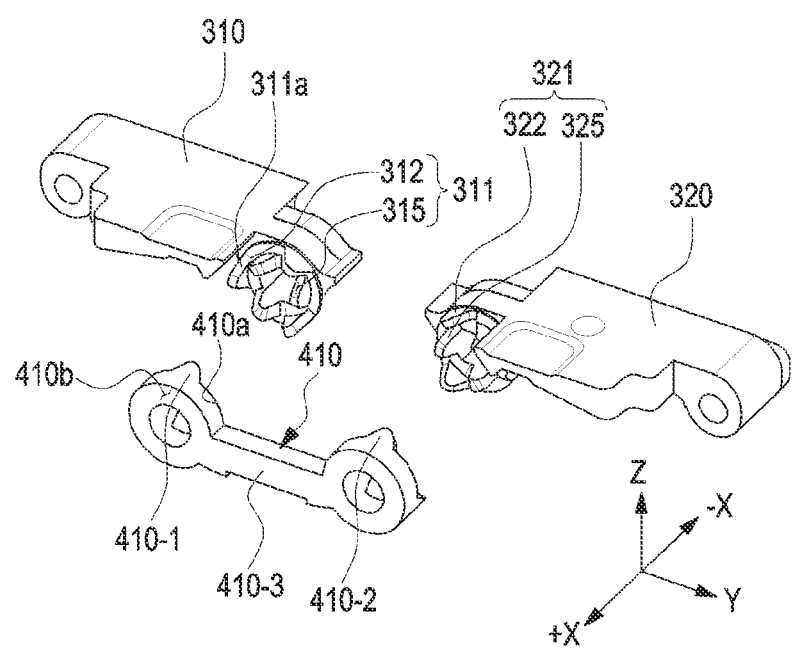
FIG. 9 is a front perspective view illustrating a first arm member, a second arm member, and a third cam structure according to various embodiments of the disclosure.
Figure 10:
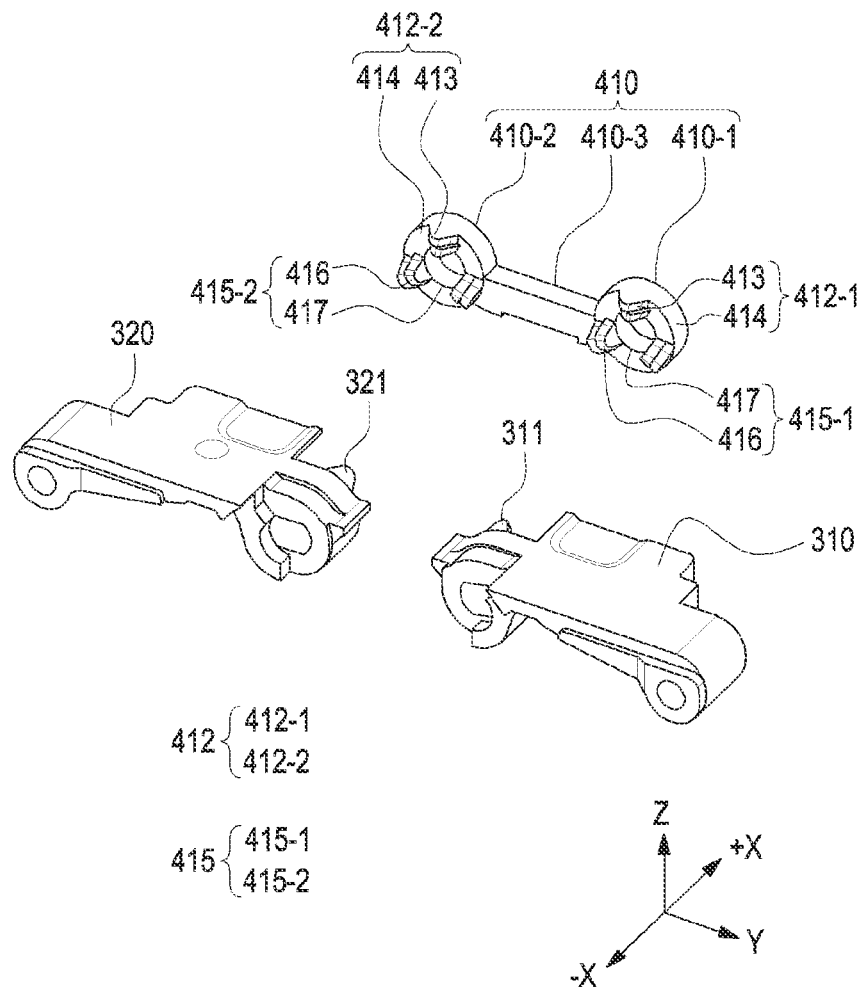
FIG. 10 is a rear perspective view illustrating a first arm member, a second arm member, and a third cam structure according to various embodiments of the disclosure.
Figure 11:
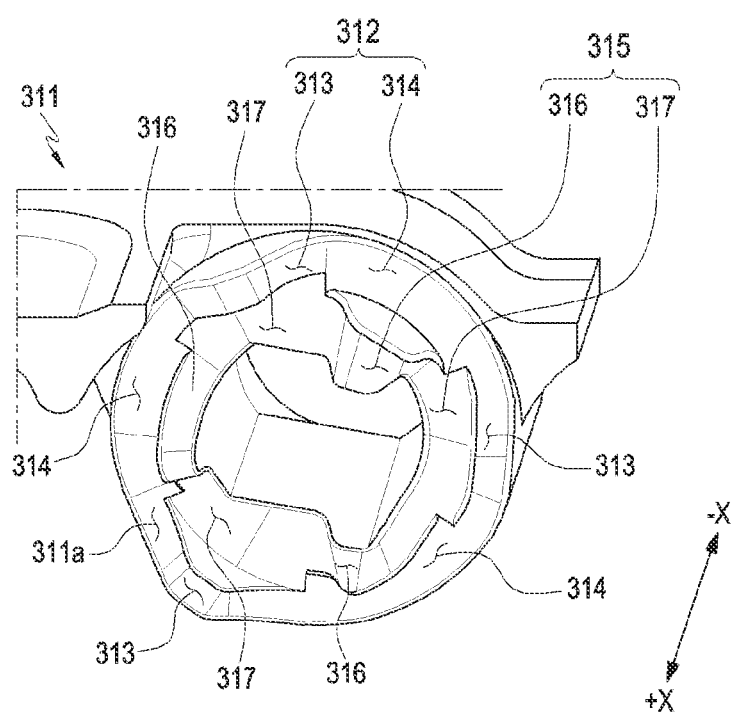
FIG. 11 is a perspective view illustrating a first cam structure according to an embodiment of the disclosure.

FIG. 9 is a front perspective view illustrating a first arm member, a second arm member, and a third cam structure according to various embodiments of the disclosure. FIG. 10 is a rear perspective view illustrating the first arm member, the second arm member, and the third cam structure according to various embodiments of the disclosure. FIG. 11 is a perspective view illustrating the first cam structure according to an embodiment of the disclosure.

Referring to FIGS. 9 to 11, in an embodiment, the first arm member 310 and the second arm member 320 may include outer cam structures 312 and 322 and inner cam structures 315 and 325. The configuration of the first cam structure 311, the second cam structure 321, and/or the third cam structure 410 of FIGS. 9 to 11 may be wholly or partially the same as that of the first cam structure 311, the second cam structure 321, and/or the third cam structure 410 of FIG. 8.

According to various embodiments, the first cam structure 311 and/or the second cam structure 321 may include the outer cam structures 312 and 322 and the inner cam structures 315 and 325. According to an embodiment, the first cam structure 311 may include a first inner cam structure 315 surrounding the first gear shaft (e.g., the first gear shaft 332 of FIG. 8) and a first outer cam structure 312 surrounding the first inner cam structure 315. According to an embodiment, the second cam structure 321 may include a second inner cam structure 325 surrounding the second gear shaft (e.g., the second gear shaft 334 of FIG. 8) and a second outer cam structure 322 surrounding the second inner cam structure 325. According to an embodiment, the outer cam structures 312 and 322 may rotate around the substantially same axes (e.g., the first interlock shaft Rx1 or the second interlock shaft Rx2 of FIG. 8) as those of the inner cam structures 315 and 325. For example, the first outer cam structure 312 and the first inner cam structure 315 may rotate around the first interlocking axis (e.g., the first interlocking axis Rx1 of FIG. 8), and the second outer cam structure 322 and the second inner cam structure 325 may rotate around the second interlocking axis (e.g., the second interlocking axis Rx2 of FIG. 8). The first outer cam structure 312 and the first inner cam structure 315 may be interpreted (or referred to) as cam structures formed in the first cam structure 311, and the second outer cam structure 322 and the second inner cam structure 325 may be interpreted as cam structures formed in the second cam structure 321.

According to various embodiments, as shown in FIG. 11, the first cam structure 311 may include first mountain portions 313 and 316 and first valley portions 314 and 317 formed or defined on a first surface 311a facing the third cam structure 410. According to an embodiment, the first outer cam structure 312 of the third cam structure 410 may include a first outer mountain portion 313 and a first outer valley portion 314. The first outer mountain portion 313 and the first outer valley portion 314 may be arranged alternately along a rotation direction (e.g., the first interlocking axis Rx1 or the second interlocking axis Rx2) of the first cam structure 311. According to an embodiment, the first inner cam structure 315 of the third cam structure 410 may include a first inner mountain portion 316 and a first inner valley portion 317. The first inner mountain portion 316 and the first inner valley portion 317 may be alternately arranged along the rotation direction of the first cam structure 311. According to an embodiment, when the first surface 311a of the first cam structure 311 is viewed in a fourth direction (e.g., the −X direction), the first mountain portions 313 and 316 may protrude further than the first valley portions 314 and 317.

According to an embodiment, the first cam structure 311 and the second cam structure 321 may be disposed on opposing sides of the folding axis (e.g., the folding axis A of FIG. 1), and have an overall symmetrical shape with respect to the folding axis A. For example, the configuration of the second outer cam structure 322 and/or the second inner cam structure 325 of the second cam structure 321 may be wholly or partially the same as that of the first outer cam structure 312 and/or the first inner cam structure 315 of the first cam structure 321.

According to various embodiments, the third cam structure 410 may include the $(3\text{-}1)^{th}$ cam structure 410-1 corresponding to the first cam structure 311, the $(3\text{-}2)^{th}$ cam structure 410-2 corresponding to the second cam structure 321, and a connection area 410-3 connecting the $(3\text{-}1)^{th}$ cam structure 410-1 and the $(3\text{-}2)^{th}$ cam structure 410-2. According to an embodiment, the third cam structure 410 may include a third surface 410a facing the first arm member 310 and the second arm member 320, and a fourth surface 410b opposite to the third surface 410a and facing the elastic member (e.g., the elastic member 420 of FIG. 8). According to an embodiment, the $(3\text{-}1)^{th}$ cam structure 410-1 and the $(3\text{-}2)^{th}$ cam structure 410-2 may be disposed on both sides of the folding axis (e.g., the folding axis A of FIG. 1) and have an overall symmetrical shape with respect to the folding axis A. For example, a first third outer cam structure (hereinafter, will be referred to as "$(3\text{-}1)^{th}$ outer cam structure") 412-1 and a first third inner cam structure (hereinafter, will be referred to as "$(3\text{-}1)^{th}$ inner cam structure") 415-1 of the $(3\text{-}1)^{th}$ cam structure 410-1 may be symmetrical to a second third outer cam structure (hereinafter, will be referred to as "$(3\text{-}2)^{th}$ outer cam structure") 412-2 and a second third inner cam structure (hereinafter, will be referred to as "$(3\text{-}2)^{th}$ inner cam structure") 415-2 of the $(3\text{-}2)^{th}$ cam structure 410-2 with respect to the folding axis A.

According to various embodiments, the third cam structure 410 may include a third inner cam structure 415 surrounding a gear shaft (e.g., the first gear shaft 332 and/or the second gear shaft 334 of FIG. 8) and a third outer cam structure 412 surrounding the third inner cam structure 415. According to an embodiment, the third inner cam structure 415 may be formed in a shape corresponding to the first inner cam structure 315 and/or the second inner cam structure 325. For example, the third inner cam structure 415 may include the $(3\text{-}1)^{th}$ inner cam structure 415-1 facing the first inner cam structure 315 and the $(3\text{-}2)^{th}$ inner cam structure 415-2 facing the second inner cam structure 325. According to an embodiment, the third outer cam structure 412 may contact the first outer cam structure 312 and/or the second outer cam structure 322. For example, the third outer cam structure 412 may include the $(3\text{-}1)^{th}$ outer cam structure 412-1 facing the first outer cam structure 312 and the $(3\text{-}2)^{th}$ outer cam structure 412-2 facing the second outer cam structure 322.

According to various embodiments, the third cam structure 410 may be formed to correspond to the first cam structure 311 and/or the second cam structure 321. For example, the third cam structure 410 may include third mountain portions 413 and 416 and third valley portions 414 and 417 formed or defined on the third surface 410a facing the first cam structure 311 and/or the second cam structure 321.

According to an embodiment, the third outer cam structure 412 of the third cam structure 410 may include a third outer mountain portion 413 and a third outer valley portion 414. The third outer mountain portion 413 and the third outer valley portion 414 may be alternately arranged along a rotation direction of an interlocking axis (e.g., the first interlocking axis Rx1 or the second interlocking axis Rx2). The third outer mountain portion 413 and the third outer valley portion 414 of the third cam structure 410 may contact the first outer mountain portion 313 and the first outer valley portion 314 of the first cam structure 311 and/or the second outer mountain portion 323 and the second outer valley portion 324 of the second cam structure 321.

According to an embodiment, the third inner cam structure 415 of the third cam structure 410 may include the third inner mountain portion 416 and the third inner valley portion 417. The third inner mountain portion 416 and the third inner valley portion 417 may be alternately arranged along the rotational direction of the interlocking axis (e.g., the first interlocking axis Rx1 or the second interlocking axis Rx2). The third inner mountain portion 416 and the third inner valley portion 417 of the third cam structure 410 may contact the first inner mountain portion 316 and the first inner valley portion 317 of the first cam structure 311 and/or the second inner mountain portion 326 and the second inner valley portion 327 of the second cam structure 321.

Figure 12A:
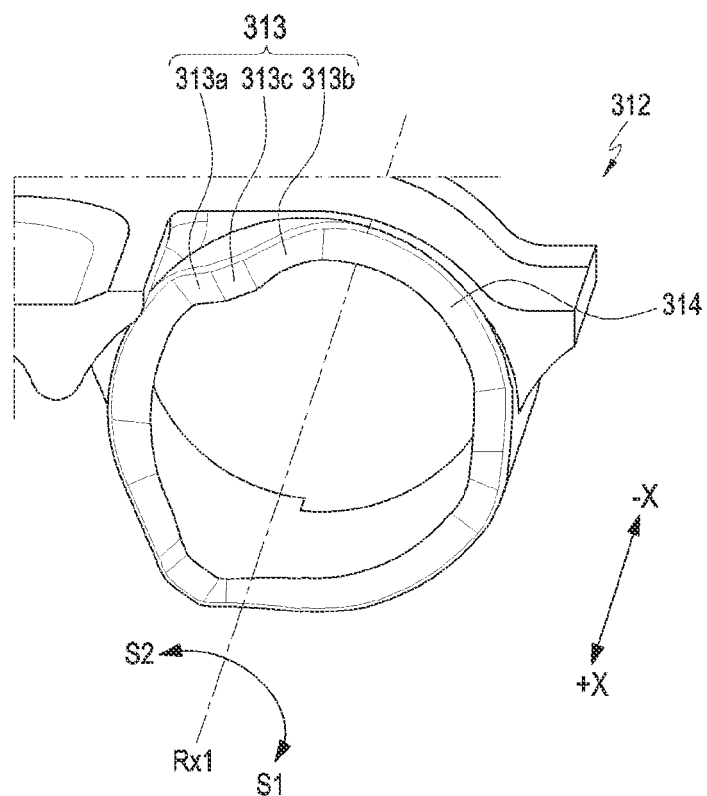
FIG. 12A is a perspective view illustrating an outer cam structure according to various embodiments of the disclosure.
Figure 12B:
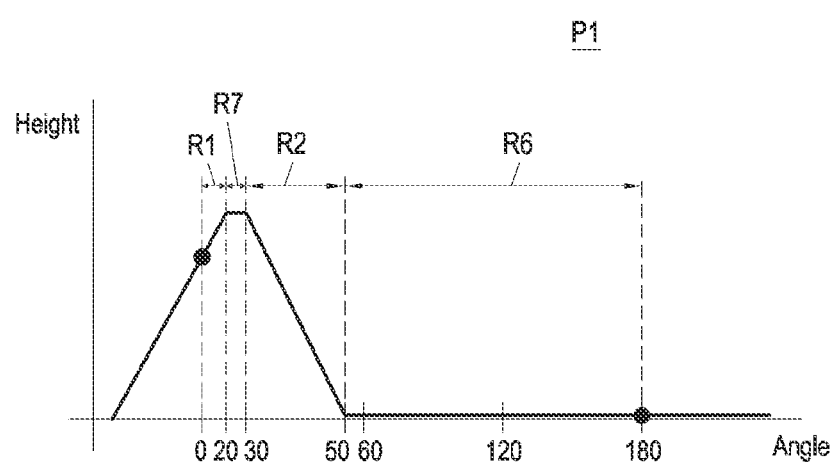
FIG. 12B is a graph illustrating a first cam profile.
Figure 13A:
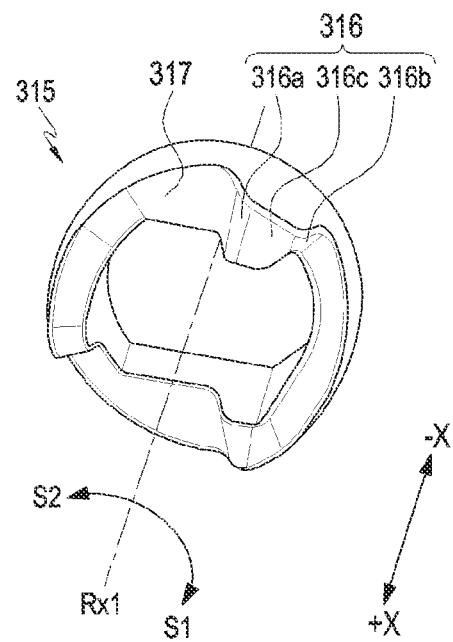
FIG. 13A is a perspective view illustrating an inner cam structure according to various embodiments of the disclosure.
Figure 13B:
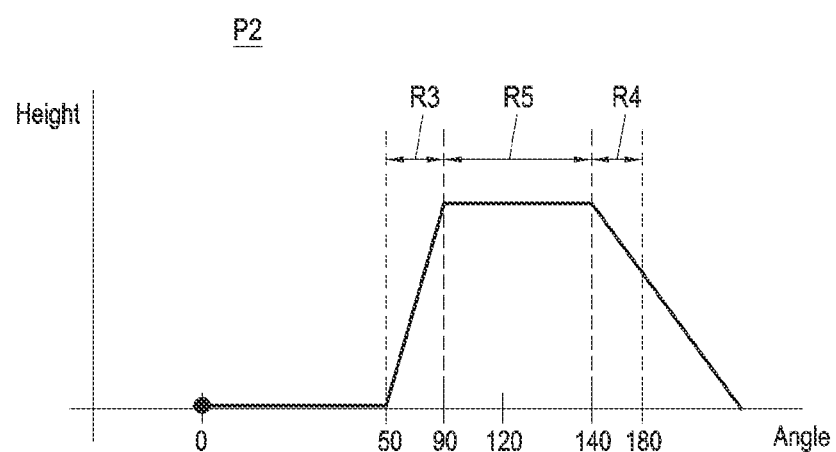
FIG. 13B is a graph illustrating a second cam profile.
Figure 14:
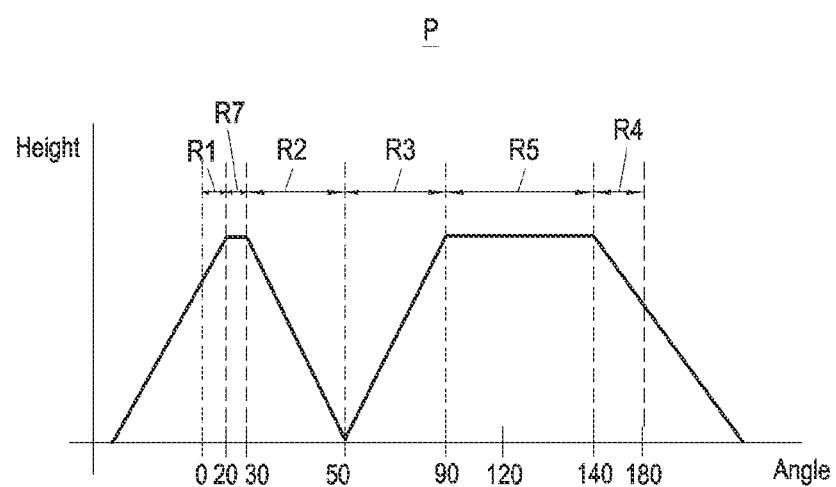
FIG. 14 is a graph illustrating a cam profile obtained by combining a first cam profile and a second cam profile.

FIG. 12A is a perspective view illustrating an outer cam structure according to various embodiments of the disclosure, and FIG. 12B is a graph illustrating a first cam profile. FIG. 13A is a perspective view illustrating an inner cam structure according to various embodiments of the disclosure, and FIG. 13B is a graph illustrating a second cam profile. FIG. 14 is a graph illustrating a cam profile obtained by combining a first cam profile and a second cam profile.

Referring to FIGS. 12A, 12B, 13A, 13B, and 14, in an embodiment, the first cam structure 311 may include the first outer cam structure 312 forming (or corresponding to) a first cam profile P1, and the first inner cam structure 315 forming a second cam profile P2. The configuration of the first cam structure 311 including the first outer cam structure 312 and the first inner cam structure 315 of FIGS. 12A, 12B, 13A, 13B, and 14 may be wholly or partially the same as the configuration of the first cam structure 311 of FIGS. 9 to 11. According to an embodiment, a cam profile (e.g., the first cam profile P1 or the second cam profile P2) may be interpreted as a cam contour. For example, the cam profiles P1 and P2 may be trajectories of a height of the first surface 311a of the first cam structure 311 changed based on an angle between the first housing (e.g., the first housing 110 of FIG. 1) and the second housing (e.g., the second housing 120 of FIG. 1) of the electronic device (e.g., the electronic device 100 of FIG. 1). According to an embodiment, a cam profile may be interpreted as a value obtained by subtracting the radius of a base circle formed around a camshaft (not shown) from the surface (e.g., the first surface 310a) of a lobe of the camshaft and a cam. According to an embodiment, the radius of the base circle may be the distance between the camshaft and the surface of a valley portion (e.g., the first outer valley portion 314). According to an embodiment, a specified angular range (e.g., a first specified angular range R1) may be interpreted as a range of angles between the first housing 110 and the second housing 120 of the electronic device 100. For example, the first specified angular range R1 may be an angle between the first front surface (e.g., the first front surface 110a of FIG. 1) of the first housing 110 and the second front surface (e.g., the second front surface 120a of FIG. 1) of the second housing 120.

According to various embodiments (e.g., FIGS. 12A and 12B), the first outer mountain portion 313 and the first outer valley portion 314 of the first outer cam structure 312 may be formed as (or configured to have) the first cam profile P1. According to an embodiment, the first outer mountain portion 313 may provide a force (e.g., frictional force and/or elastic force) to the third cam structure (e.g., the third cam structure 410 of FIG. 10) in a first rotation direction S1 for closing the electronic device 100 in the first specified angular range R1. For example, the first outer mountain portion 313 may include a first rising surface 313a formed in a direction (e.g., the +X direction) in which the length of the first outer cam structure 312 increases. In the first specified angular range R1, the first rising surface 313a may contact the third outer mountain portion (e.g., the third outer mountain portion 413 of FIG. 10) of the third cam structure (e.g., the third cam structure 410 of FIG. 10), and the first outer cam structure 312 may receive a force (e.g., frictional force and/or elastic force) in the direction for closing the electronic device 100. According to an embodiment, the first specified angular range R1 may be about 0 degrees to about 20 degrees.

According to an embodiment, the first outer mountain portion 313 may provide a force (e.g., frictional force and/or elastic force) to the third cam structure 410 in a second rotational direction S2 for opening the electronic device 100 in a second specified angular range R2 different from the first specified angular range R1. For example, the first outer mountain portion 313 may include a first falling surface 313b formed in a direction (e.g., the −X direction) in which the length of the first outer cam structure 312 decreases. In the second specified angular range R2, the first falling surface 313b may contact the third outer mountain portion 413 of the third cam structure 410, and the first outer cam structure 312 may receive a force (e.g., frictional force and/or elastic force) in a direction for opening the electronic device 100. According to an embodiment, the second specified angular range R2 may be about 30 degrees to about 50 degrees. According to an embodiment, the first outer valley portion 314, the first rising surface 313a, a first connecting surface 313c, and the first falling surface 313b may be arranged in this order in the first direction S1 for closing the electronic device 100, and the first connecting surface 313c may be a surface protruding further than the first outer valley portion 314. The first rising surface 313a and/or the first falling surface 313b may be a surface formed to be inclined between the first outer valley portion 314 and the first connecting surface 313c.

According to an embodiment, the first outer cam structure 312 may not receive a force (e.g., frictional force or elastic force) for rotating the first cam structure 311 or maintaining the position of the first cam structure 311 in a sixth specified angular range R6 different from the first specified angular range R1 or the second specified angular range R2. For example, in the sixth specified angular range R6, the first outer valley portion 314 may face the third outer mountain portion 413 of the third cam structure 410. According to an embodiment, the sixth specified angular range R6 may be 50 degrees to 180 degrees.

According to an embodiment, the first outer mountain portion 313 may be located between the first rising surface 313a and the first falling surface 313b and include the first connecting surface 313c of which at least a part is substantially flat. In a seventh specified angular range R7, the first connecting surface 313c may contact the third outer mountain portion 413 of the third cam structure 410. According to an embodiment, the seventh specified angular range R7 may be about 20 degrees to about 30 degrees.

According to various embodiments (e.g., FIGS. 13A and 13B), the first inner mountain portion 316 and the first inner valley portion 317 of the first inner cam structure 315 may be formed as the second cam profile P2.

According to an embodiment, the first inner cam structure 315 may provide a force (e.g., frictional force and/or elastic force) to the third cam structure (e.g., the third cam structure 410 of FIG. 10) in the first rotation direction S1 for closing the electronic device 100 in a third specified angular range R3. For example, the first inner mountain portion 316 may include a second rising surface 316a formed in the direction (e.g., the +X direction) in which the length of the first inner cam structure 315 increases. In the third specified angular range R3 different from the first specified angular range R1, the second rising surface 316a may contact the third inner mountain portion 416 of the third cam structure 410, and receive a force (e.g., frictional force and/or elastic force) in the direction for closing the electronic device 100. According to an embodiment, the third specified angular range R3 may be about 50 degrees to about 90 degrees.

According to an embodiment, the first inner mountain portion 316 may receive a force (e.g., frictional force and/or elastic force) from the third cam structure 410 in the second rotational direction S2 for opening the electronic device 100 in a fourth specified angular range R4 different from the third specified angular range R3. For example, the first inner mountain portion 316 may include a second falling surface 316b formed in the direction (e.g., the −X direction) in which the length of the first inner cam structure 315 decreases. In the fourth specified angle range R2, the second falling surface 316b may contact the third inner mountain portion 416 of the third cam structure 410, and the first cam structure 311 may receive a force (e.g., frictional force and/or elastic force) in the direction for opening the electronic device 100. According to an embodiment, the fourth specified angular range R4 may be about 140 degrees to about 180 degrees. According to an embodiment, the first inner valley portion 317, the second rising surface 316a, a second connecting surface 316c, and the second falling surface 316b may be arranged in this order in the first direction S1 for closing the electronic device 100, and the second connecting surface 316c may protrude further than the first inner valley portion 317. The second rising surface 316a and/or the second falling surface 316b may be a surface inclined between the first inner valley portion 317 and the second connecting surface 316c.

According to an embodiment, the first inner mountain 316 may be located between the second rising surface 316a and the second falling surface 316b and include the second connecting surface 316c, of which at least a part is substantially flat. In the seventh specified angular range R7, the first connecting surface 313c may contact the third outer mountain portion 413 of the third cam structure 410, and when an external force applied to the electronic device 100 is less than an external force applied to the elastic member (e.g., the elastic member 420 of FIG. 8), the electronic device 100 may be maintained in a stationary state. The second connecting surface 316c may be interpreted as a free stop structure. According to an embodiment, the seventh specified angular range R7 may be about 90 degrees to about 140 degrees.

According to an embodiment, the first inner cam structure 315 may not a frictional force or an elastic force from the third cam structure 410 in an eighth specified angular range R8 different from the third specified angular range R3, the fourth specified angular range R4, or a fifth specified angular range R5. For example, in the eighth specified angular range R8, the first inner valley portion 317 may contact the third inner valley portion 416 of the third cam structure 410, and the first inner valley portion 316 may contact the third inner valley portion 417. According to an embodiment, the eighth specified angular range R8 may be 0 degrees to 50 degrees.

According to various embodiments, the first cam structure 311 may rotate based on a cam profile P formed by the first outer cam structure 312 and the first inner cam structure 315. The cam profile P may be interpreted as a cam profile in which the first cam profile P1 and the second cam profile P2 are combined. For example, the first cam structure 311 may rotate based on the first cam profile P1 and the second cam profile P2.

According to an embodiment, in the first specified angular range R1 (e.g., 0 degrees to 20 degrees), the first cam structure 311 may receive a force (e.g., frictional force and/or elastic force) in the direction for closing the electronic device (e.g., the electronic device 100 of FIG. 1) by the third cam structure (e.g., the third cam structure 410 of FIG. 10).

According to an embodiment, in the seventh specified angular range R7 (e.g., 20 degrees to 30 degrees), the first cam structure 311 may receive an elastic force from the elastic member (e.g., the elastic member 420 of FIG. 8). When an external force applied to the electronic device 100 is less than the sum of a force applied to the first cam structure 311 and the third cam structure 410 and a force applied to the second cam structure 321 and the third cam structure 410 by the elastic member (e.g., the elastic member 420 of FIG. 8), the electronic device 100 may be maintained in the stationary state.

In the second specified angular range R2 (e.g., about 30 degrees to about 50 degrees), the first cam structure 311 may receive a force (e.g., frictional force and/or elastic force) from the third cam structure 410 in the direction for opening the electronic device 100 (e.g., about 30 degrees to about 50 degrees). As the first cam structure 311 rotates in the direction for opening the electronic device 100, an external force to unfold the electronic device 100 may be reduced, and user convenience may be increased. For example, the user may open the electronic device 100 with a relatively weak force (e.g., with one hand). According to an embodiment, the first cam structure 311 may be stopped at a specified angle (e.g., about 50 degrees) between the second specified angular range R2 and the third specified angular range R3.

In the third specified angular range R3 (e.g., about 50 degrees to about 90 degrees), the first cam structure 311 may receive a force (e.g., frictional force and/or elastic force) from the third cam structure (e.g., the third cam structure 410 of FIG. 10) in the direction for closing the electronic device (e.g., the electronic device 100 of FIG. 1). In the fifth specified angular range R5 (e.g., about 90 degrees to about 140 degrees), the first cam structure 311 may receive an elastic force from the elastic member (e.g., the elastic member 420 of FIG. 8). When an external force applied to the electronic device 100 is less than the sum of a force applied to the first cam structure 311 and the third cam structure 410 and a force applied to the second cam structure 321 and the third cam structure 410 by the elastic member (e.g., the elastic member 420 of FIG. 8), the electronic device 100 may be maintained in the stationary state. For example, the electronic device 100 may be maintained in the stationary state in the fifth specified angular range R5.

In the fourth specified angular range R4 (e.g., about 140 degrees to about 180 degrees), the first cam structure 311 may receive a force (e.g., frictional force and/or elastic force) from the third cam structure 410 in the direction for opening the electronic device 100. As the first cam structure 311 rotates in the direction for opening the electronic device 100, the strength of an external force to unfold the electronic device 100 may be reduced, and user convenience may be increased.

According to various embodiments, the configuration of the second cam structure (e.g., the second cam structure 321 of FIG. 9) may be substantially the same as that of the first cam structure 311. For example, the second cam structure 321 may form a cam profile substantially the same as the first cam profile P1 and/or the second cam profile P2 of the first cam structure 311.

Figure 15:
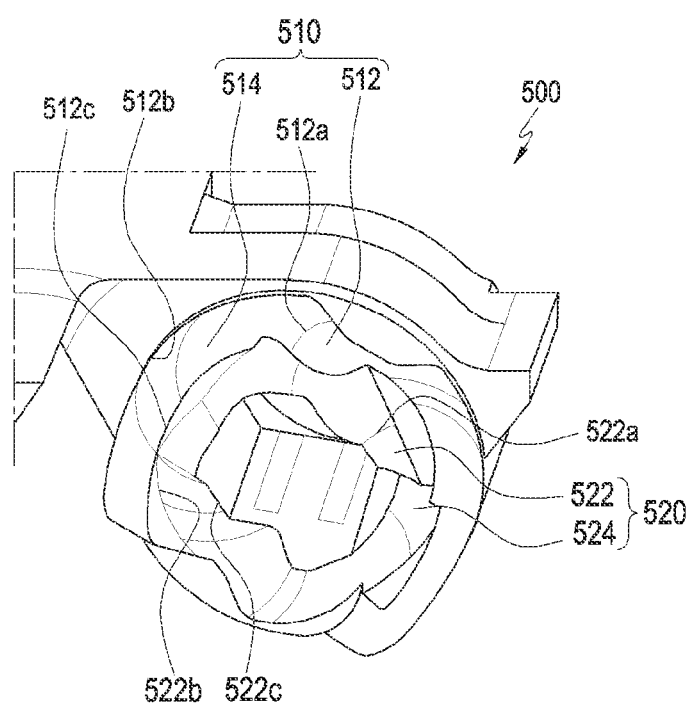
FIG. 15 is a perspective view illustrating a cam structure according to another embodiment of the disclosure.
Figure 16A:
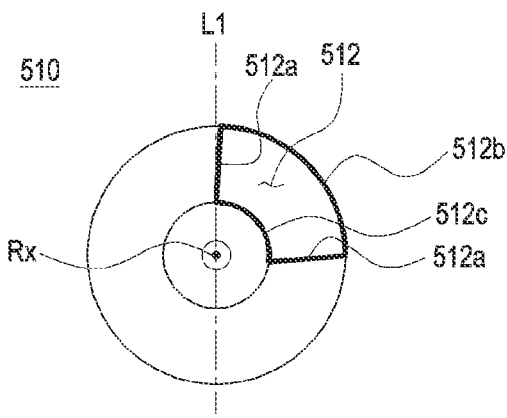
FIGS. 16A, 16B, and 16C are diagrams illustrating an inner cam line and an outer cam line according to various embodiments of the disclosure.
Figure 16B:
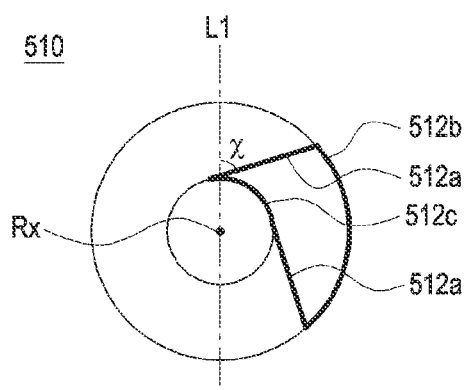
Figure 16C:
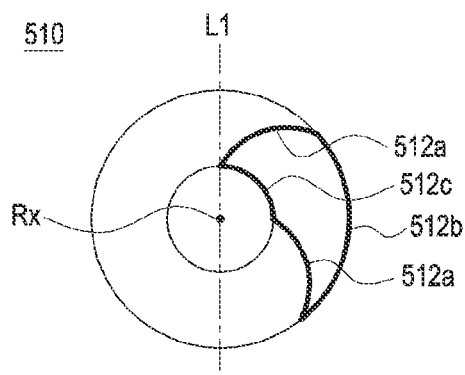

FIG. 15 is a perspective view illustrating a cam structure according to another embodiment of the disclosure. FIGS. 16A, 16B, and 16C are diagrams illustrating an inner cam line and an outer cam line according to various embodiments of the disclosure.

Referring to FIGS. 15, 16a, 16b, and 16c, in an embodiment, a cam structure 500 may include an outer cam structure 510 and an inner cam structure 520 surrounded by the outer cam structure 510. The configurations of the cam structure 500, the outer cam structure 510, and the inner cam structure 520 of FIGS. 15, 16A, 16B, and 16C may be wholly or partially the same as those of the cam structures 311 and 321, the outer cam structures 312 and 322, the inner cam structures 315 and 325 of FIG. 9, respectively.

According to various embodiments, the outer cam structure 510 and/or the inner cam structure 520 of the cam structure 500 may be formed to be inclined with respect to the cam structure 500.

According to various embodiments, the outer cam structure 510 may include an outer mountain portion 512 (e.g., first outer mountain portion 313 and/or the second outer mountain portion 323 of FIG. 8) and an outer valley portion 514 (e.g., the first outer valley portion 314 and/or the second outer mountain portion 324 of FIG. 8). The outer mountain portion 512 may be formed to be inclined at a first specified angle x with respect to a first imaginary line L1 perpendicular to an interlocking axis Rx (e.g., the first interlocking axis Rx1 and/or the second interlocking axis Rx2 of FIG. 8). For example, the outer mountain portion 512 may include an outer cam line 512a that is a skew line with respect to the interlocking axis Rx. According to an embodiment, the first specified angle x may be about 45 degrees. According to an embodiment, the outer cam line 512a may be a line crossing an outer circumferential surface 512b of the outer cam structure 510 forming the outer surface of the outer cam structure 510 and an inner circumferential surface 512c of the outer cam structure 510 surrounding the inner cam structure 520.

According to various embodiments, the inner cam structure 520 may include an inner mountain portion 522 (e.g., the first inner mountain portion 316 and/or the second inner mountain portion 326 of FIG. 8) and an inner valley portion 524 (e.g., the first inner valley portion 317 and/or the second inner valley portion 327 of FIG. 8). The inner mountain portion 522 may be formed to be inclined at a second specified angle (not shown) with respect to the first imaginary line L1 perpendicular to the interlocking axis Rx (e.g., the first interlocking axis Rx1 and/or the second interlocking axis Rx2 of FIG. 8). For example, the inner mountain portion 522 may include an inner cam line 512a which is a skew line with respect to the interlocking axis Rx. According to an embodiment, the second specified angle (not shown) may be about 45 degrees. According to an embodiment, the inner cam line 522a may be a line crossing an outer circumferential surface 522b of the inner cam structure 520 forming the outer surface of the outer cam structure 510 and an inner circumferential surface 522c of the inner cam structure 520 surrounding a gear shaft (e.g., the first gear shaft 332 or the second gear shaft 334 of FIG. 8).

According to various embodiments (e.g., FIG. 15 or FIG. 16C), the outer cam line 512a and/or the inner cam line 522a may be a curved line. According to an embodiment, the outer cam line 512a may be a line extending from the outer circumferential surface 512b to the inner circumferential surface 512c of the outer cam structure 510 and located at substantially the same height (e.g., in the X-axis direction). According to an embodiment, the inner cam line 522a may extend from the outer circumferential surface 522b of the inner cam structure 520 to the inner circumferential surface 522c of the inner cam structure 520 and be located at substantially the same height (e.g., in the X-axis direction). According to an embodiment, the outer cam line 512a and/or the inner cam line 522a may be a curved line formed along a first rotational direction (e.g., the first rotational direction S1 of FIG. 12A) and/or a second rotational direction (e.g., the second rotational direction S2 of FIG. 12A) with respect to the interlocking axis Rx.

According to an embodiment, as the outer cam line 512a is bent, the length of line contact between the outer cam structure 510 and the third cam structure (e.g., the third cam structure 410 of FIG. 8) may be increased, and the strength of a force applied to the cam structure 530 per length may be reduced. According to an embodiment, the durability of the cam structure 530 (e.g., FIG. 15 or FIG. 16C) including the bent outer cam line 512a and/or the bent inner cam line 522a may be greater than that of the outer cam structure 510 (e.g., FIG. 16) including the substantially straight outer cam line 512a and/or the substantially straight outer cam line 512a.

According to various embodiments, an electronic device (e.g., the electronic device 100 of FIG. 1) may include a first housing (e.g., the first housing 110 of FIG. 1), a second housing (e.g., the second housing 120 of FIG. 1) which provides movement relative to the first housing, a display (e.g., the display 130 of FIG. 1) disposed in the first housing and the second housing, and a hinge module (e.g., the hinge module 180 of FIG. 3) connecting the first housing and the second housing to be rotatable from a folded state to an unfolded state. The hinge module may include a first rotation member (e.g., the first rotation member 210 of FIG. 5) connected to the first housing, a second rotation member (e.g., the second rotation member 220 of FIG. 5) connected to the second housing, a rotation bracket (e.g., the rotation bracket 230 of FIG. 6) in which the first rotation member and the second rotation member are disposed, a first arm member (e.g., the first arm member 310 of FIG. 8) connected to the first rotation member and including a first cam structure (e.g., the first cam structure 311 of FIG. 8), a second arm member (e.g., the second arm member 320 of FIG. 8) connected to the second rotation member and including a second cam structure (e.g., the second cam structure 321 of FIG. 8), and a third cam structure (e.g., the third cam structure 410 of FIG. 9) facing the first cam structure and the second cam structure. The first cam structure and the second cam structure may include an outer cam structure (e.g., the first outer cam structure 312 and/or the second outer cam structure 322 of FIG. 9) having a first cam profile (e.g., the first cam profile P1 of FIG. 12B) and an inner cam structure (e.g., the first inner cam structure 315 and/or the second inner cam structure 325 of FIG. 9) surrounded by the outer cam structure and having a second cam profile (e.g., the second cam profile P2 of FIG. 13B) different from the first cam profile.

According to various embodiments, the outer cam structure may include an outer mountain portion (e.g., the outer mountain portion 512 of FIG. 15) including an outer cam line (e.g., the outer cam line 512a of FIG. 15) inclined at a first specified angle (e.g., the first specified angle x1 of FIG. 16B) with respect to a first imaginary line (e.g., the first imaginary line L1 of FIG. 16A) perpendicular to an interlocking axis (e.g., the first interlocking axis Rx1 and/or the second interlocking axis Rx2 of FIG. 8). The inner cam structure may include an inner mountain portion (e.g., the inner mountain portion 522 of FIG. 15) including an inner cam line (e.g., the inner cam line 522a of FIG. 15) inclined at a second specified angle with respect to the first imaginary line.

According to various embodiments, the inner cam line and the outer cam line may be curved lines.

According to various embodiments, the hinge module may include a first pin member (e.g., the first pin member 340 of FIG. 5) connected to the first arm member and a second pin member (e.g., the second pin member 350 of FIG. 5) connected to the second arm member. The first rotation member may be provided with a first pin hole (e.g., the first pin hole 212 of FIG. 6) in which the first pin member is disposed, and the second rotation member may be provided with a second pin hole (e.g., the second pin hole 222 of FIG. 6) in which the second pin member is disposed.

According to various embodiments, the first arm member may be configured to slide with respect to the first rotation member, and the second arm member may be configured to slide with respect to the second rotation member.

According to various embodiments, the hinge module may include a first gear shaft (e.g., the first gear shaft 332 of FIG. 8) connected to the first arm member, a second gear shaft (e.g., the second gear shaft 334 of FIG. 8) connected to the second arm member, and a plurality of idle gears (e.g., the idle gears 336 of FIG. 8) connected to the first gear shaft and the second gear shaft.

According to various embodiments, the first cam structure may include a first inner cam structure (e.g., the first inner cam structure 315 of FIG. 9) surrounding the first gear shaft and a first outer cam structure (e.g., the first outer cam structure 312 of FIG. 9) surrounding the first inner cam structure, and the second cam structure may include a second inner cam structure (e.g., the second inner cam structure 325 of FIG. 9) surrounding the second gear shaft and a second outer cam structure (e.g., the second outer cam structure 322 of FIG. 9) surrounding the second inner cam structure.

According to various embodiments, the hinge module may include an elastic member (e.g., the elastic member 420 of FIG. 8) which provides an elastic force to the first cam structure and the second cam structure and facing the third cam structure.

According to various embodiments, the electronic device may further include a hinge housing (e.g., the hinge housing 140 of FIG. 4) connected to the first rotation member and the second rotation member, wherein at least a part of the hinge module is disposed in the hinge housing.

According to various embodiments, the hinge module may include a fixing bracket (e.g., the fixing bracket 430 of FIG. 5) connected to the elastic member and the hinge housing.

According to various embodiments, the hinge module may include a first hinge module (e.g., the first hinge module 180-1 of FIG. 4) and a second hinge module (e.g., the second hinge module 180-2 of FIG. 4) facing the first hinge module.

According to various embodiments, the outer cam structure may provide a force (e.g., frictional force and/or elastic force) to the third cam structure in a first rotational direction (e.g., the first rotational direction S1 of FIG. 12A) for closing the electronic device in a first specified angular range (e.g., the first specified angular range R1 of FIG. 12B), and provide a force (e.g., frictional force and/or elastic force) to the third cam structure in a second rotational direction (e.g., the second rotational direction S2 of FIG. 12A) for opening the electronic device in a second specified angular range (e.g., the second specified angular range R2 of FIG. 12B) different from the first specified angular range. The inner cam structure may provide a force (e.g., frictional force and/or elastic force) to the third cam structure in the first rotational direction in a third specified angular range (e.g., the third specified angular range R3 of FIG. 13A) different from the first specified angular range, and provide a force (e.g., frictional force and/or elastic force) to the third cam structure in the second rotational direction in a fourth specified angular range (e.g., the fourth specified angular range R4 of FIG. 13B) different from the second specified angular range.

According to various embodiments, the inner cam structure may include a connecting surface (e.g., the first connecting surface 313c of FIG. 12A or the second connecting surface 316c of FIG. 13A), where at least a part of the connecting surface contacting the third cam structure in a fifth specified angular range (e.g., the fifth specified angular range R5 of FIG. 13B) between the third specified angular range R3 and the fourth specified angular range R4 is substantially flat.

According to various embodiments, the third cam structure may include a $(3\text{-}1)^{th}$ cam structure (e.g., the $(3\text{-}1)^{th}$ cam structure 410-1 of FIG. 10) corresponding to the first cam structure, a $(3\text{-}2)^{th}$ cam structure (e.g., the $(3\text{-}2)^{th}$ cam structure 410-2 of FIG. 10) corresponding to the second cam structure, and a connection area (e.g., the connection area 410-3 of FIG. 10) connected to the $(3\text{-}1)^{th}$ cam structure and the $(3\text{-}2)^{th}$ cam structure.

According to various embodiments, the $(3\text{-}1)^{th}$ cam structure and the $(3\text{-}2)^{th}$ cam structure may include a third inner cam structure (e.g., the third inner cam structure 415 of FIG. 10) contacting the inner cam structure and a third outer cam structure (e.g., the third outer cam structure 412 of FIG. 10) contacting the outer cam structure.

According to various embodiments, the outer cam structure may include a first outer cam structure (e.g., the first outer cam structure 312 of FIG. 9) configured to rotate around a first interlocking axis (e.g., the first interlocking axis Rx1 of FIG. 8), and a second outer cam structure (e.g., the second outer cam structure 322 of FIG. 9) configured to rotate around a second interlocking axis (e.g., the second interlocking axis Rx2 of FIG. 8) spaced apart from the first interlocking axis. The inner cam structure may include a first inner cam structure (e.g., the first inner cam structure 315 of FIG. 9) configured to rotate around the first interlocking axis and a second inner cam structure (e.g., the second inner cam structure 325 of FIG. 9) configured to rotate around the second interlocking axis.

According to various embodiments of the disclosure, a hinge module includes a first rotation member, a second rotation member, a rotation bracket in which the first rotation member and the second rotation member are disposed, a first arm member connected to the first rotation member and including a first cam structure, a second arm member connected to the second rotation member and including a second cam structure, and a third cam structure facing the first cam structure and the second cam structure. The first cam structure and the second cam structure include an inner cam structure having a first cam profile and an outer cam structure surrounding the inner cam structure and having a second cam profile different from the first cam profile.

According to various embodiments, the hinge module may include a first gear shaft (e.g., the first gear shaft 332 of FIG. 8) connected to the first arm member, a second gear shaft (e.g., the second gear shaft 334 of FIG. 8) connected to the second arm member, and a plurality of idle gears (e.g., the idle gears 336 of FIG. 8) connected to the first gear shaft and the second gear shaft.

According to various embodiments, the hinge module may include a first pin member (e.g., the first pin member 340 of FIG. 5) connected to the first arm member, and a second pin member (e.g., the second pin member 350 of FIG. 5) connected to the second arm member. The first rotation member may be provided with a first pin hole (e.g., the first pin hole 212 of FIG. 6) in which the first pin member is disposed, and the second rotation member may be provided with a second pin hole (e.g., the second pin hole 222 of FIG. 6) in which the second pin member is disposed.

According to various embodiments, an electronic device (e.g., the electronic device 100 of FIG. 1) may include a first housing (e.g., the first housing 110 of FIG. 1), a second housing (e.g., the second housing 120 of FIG. 1), and a hinge module (e.g., the hinge module 180 of FIG. 3) connecting the first housing and the second housing. The hinge module may include a first rotation member (e.g., the first rotation member 210 of FIG. 5) connected to the first housing, a second rotation member (e.g., the second rotation member 220 of FIG. 5) connected to the second housing, a first arm member (e.g., the first arm member 310 of FIG. 11) connected to the first rotation member and including a first inner cam structure (e.g., the first inner cam structure 315 of FIG. 13A) having a second cam profile (e.g., the second cam profile P1 of FIG. 12B), and a first outer cam structure (e.g., the first outer cam structure 312 of FIG. 12A) surrounding the first inner cam structure and having a first cam profile (e.g., the first cam profile P1 of FIG. 12B) different from the second cam profile, a second arm member (e.g., the second arm member 320 of FIG. 9) connected to the second rotation member and including a second inner cam structure (e.g., the second inner cam structure 325 of FIG. 9) having the second cam profile, and a second outer cam structure (e.g., the second outer cam structure 322 of FIG. 9) surrounding the second inner cam structure and having the first cam profile different from the second cam profile, and a third cam structure (e.g., the third cam structure 410 of FIG. 9) facing the first cam structure and the second cam structure. The first outer cam structure and the second outer cam structure may include an outer mountain portion (e.g., the outer mountain portion 512 of FIG. 16B) forming an outer cam line (e.g., the outer cam line 512a) inclined with respect to a first imaginary line (e.g., the first imaginary line L1 of FIG. 16A) perpendicular to an interlocking axis (e.g., the first interlocking axis Rx1 or the second interlocking axis Rx2 of FIG. and the first inner cam structure and the second inner cam structure may include an inner mountain portion (e.g., the inner mountain portion 522 of FIG. 15) forming an inner cam line (e.g., the inner cam line 522*a* of FIG. 15) inclined with respect to the first imaginary line.

The electronic device including the hinge module of the disclosure as described above is not limited to the foregoing embodiments and drawings, and it will be apparent to those skilled in the art that many replacements, modifications, and variations can be made within the technical scope of the disclosure.

What is claimed is:

1. An electronic device comprising:
   a first housing;
   a second housing configured to move relative to the first housing;
   a display disposed in the first housing and the second housing; and
   a hinge module connecting the first housing and the second housing to be rotatable from a folded state to an unfolded state,
   wherein the hinge module includes:
   a first rotation member connected to the first housing;
   a second rotation member connected to the second housing;
   a rotation bracket in which the first rotation member and the second rotation member are disposed;
   a first arm member connected to the first rotation member and including a first cam structure;
   a second arm member connected to the second rotation member and including a second cam structure; and
   a third cam structure facing the first cam structure and the second cam structure, and
   wherein each of the first cam structure and the second cam structure includes an outer cam structure having a first cam profile and an inner cam structure surrounded by the outer cam structure and having a second cam profile different from the first cam profile,
   wherein the outer cam structure comprises an outer mountain portion and the inner cam structure comprises an inner mountain portion, and
   wherein an apex of the outer mountain portion and an apex of the inner mountain portion are arranged within an angular range between the folded state to the unfolded state of the electronic device.

2. The electronic device of claim 1, wherein the outer mountain portion has an outer cam line inclined at a first specified angle with respect to a first imaginary line perpendicular to an interlocking axis, and
   wherein the inner mountain portion has an inner cam line inclined at a second specified angle with respect to the first imaginary line.

3. The electronic device of claim 2, wherein the inner cam line and the outer cam line are curved lines.

4. The electronic device of claim 1, wherein the hinge module includes a first pin member connected to the first arm member and a second pin member connected to the second arm member,
   wherein the first rotation member includes a first pin hole in which the first pin member is disposed, and
   wherein the second rotation member includes a second pin hole in which the second pin member is disposed.

5. The electronic device of claim 4, wherein the first arm member is configured to slide with respect to the first rotation member, and
   wherein the second arm member is configured to slide with respect to the second rotation member.

6. The electronic device of claim 1, wherein the hinge module includes a first gear shaft connected to the first arm member, a second gear shaft connected to the second arm member, and a plurality of idle gears connected to the first gear shaft and the second gear shaft.

7. The electronic device of claim 6, wherein the first cam structure includes a first inner cam structure surrounding the first gear shaft and a first outer cam structure surrounding the first inner cam structure, and
   wherein the second cam structure includes a second inner cam structure surrounding the second gear shaft and a second outer cam structure surrounding the second inner cam structure.

8. The electronic device of claim 1, wherein the hinge module includes an elastic member configured to provide an elastic force to the first cam structure and the second cam structure and facing the third cam structure.

9. The electronic device of claim 8, further comprising:
   a hinge housing connected to the first rotation member and the second rotation member, wherein at least a part of the hinge module is disposed in the hinge housing.

10. The electronic device of claim 9, wherein the hinge module includes a fixing bracket connected to the elastic member and the hinge housing.

11. The electronic device of claim 1, wherein the hinge module includes a first hinge module and a second hinge module facing the first hinge module.

12. The electronic device of claim 1, wherein the outer cam structure is configured to provide a force to the third cam structure in a first rotational direction for closing the electronic device in a first specified angular range, and provide a force to the third cam structure in a second rotational direction for opening the electronic device in a second specified angular range different from the first specified angular range, and
    wherein the inner cam structure is configured to provide a force to the third cam structure in the first rotational direction in a third specified angular range different from the first specified angular range, and provide a force to the third cam structure in the second rotational direction in a fourth specified angular range different from the second specified angular range.

13. The electronic device of claim 12, wherein the inner cam structure includes a connecting surface, wherein at least a part of the connecting surface contacting the third cam structure in a fifth specified angular range between the third specified angular range and the fourth specified angular range is substantially flat.

14. The electronic device of claim 1, wherein the third cam structure includes a first third cam structure corresponding to the first cam structure, a second third cam structure corresponding to the second cam structure, and a connection area connected to the first third cam structure and the second third cam structure.

15. The electronic device of claim 1, wherein the outer cam structure includes a first outer cam structure configured to rotate around a first interlocking axis, and a second outer cam structure configured to rotate around a second interlocking axis spaced apart from the first interlocking axis, and
    wherein the inner cam structure includes a first inner cam structure configured to rotate around the first interlocking axis and a second inner cam structure configured to rotate around the second interlocking axis.

16. A hinge module comprising:
    a first rotation member;
    a second rotation member;

a rotation bracket in which the first rotation member and the second rotation member are disposed;

a first arm member connected to the first rotation member and including a first cam structure;

a second arm member connected to the second rotation member and including a second cam structure; and a third cam structure facing the first cam structure and the second cam structure, wherein the first cam structure and the second cam structure include an inner cam structure having a first cam profile and an outer cam structure surrounding the inner cam structure and having a second cam profile different from the first cam profile, wherein the outer cam structure comprises an outer mountain portion and the inner cam structure comprises an inner mountain portion, and wherein the outer mountain portion and the inner mountain portion are arranged within an angular range of the hinge module.

17. The hinge module of claim 16, further comprising:

a first gear shaft connected to the first arm member;

a second gear shaft connected to the second arm member; and a plurality of idle gears connected to the first gear shaft and the second gear shaft.

18. The hinge module of claim 16, wherein the hinge module includes a first pin member connected to the first arm member, and a second pin member connected to the second arm member, wherein the first rotation member includes a first pin hole in which the first pin member is disposed, and wherein the second rotation member includes a second pin hole in which the second pin member is disposed.

19. The hinge module of claim 16, wherein outer mountain portion has an outer cam line inclined at a first specified angle with respect to a first imaginary line perpendicular to an interlocking axis, wherein the inner mountain portion has an inner cam line inclined at a second specified angle with respect to the first imaginary line.

20. An electronic device comprising:

a first housing, a second housing, and a hinge module connecting the first housing and the second housing to be rotatable between a folded state to an unfolded state of the electronic device, wherein the hinge module comprising:

a first rotation member connected to the first housing;

a second rotation member connected to the second housing;

a first arm member connected to the first rotation member and including a first inner cam structure having a second cam profile, and a first outer cam structure surrounding the first inner cam structure and having a first cam profile different from the second cam profile;

a second arm member connected to the second rotation member and including a second inner cam structure having the second cam profile, and a second outer cam structure surrounding the second inner cam structure and having the first cam profile different from the second cam profile; and a third cam structure facing the first cam structure and the second cam structure, wherein the first outer cam structure and the second outer cam structure may include an outer mountain portion forming an outer cam line inclined with respect to a first imaginary line perpendicular to an interlocking axis, wherein the first inner cam structure and the second inner cam structure may include an inner mountain portion forming an inner cam line inclined with respect to the first imaginary line, and wherein an apex of the outer mountain portion and an apex of the inner mountain portion are arranged within an angular range between the folded state to the unfolded state of the electronic device.

* * * * *